(12) United States Patent
Nakatsukasa

(10) Patent No.: US 9,404,739 B2
(45) Date of Patent: Aug. 2, 2016

(54) SHAPE MEASURING DEVICE, PROGRAM INSTALLED INTO THIS DEVICE, AND RECORDING MEDIUM STORING THIS PROGRAM

(71) Applicant: Keyence Corporation, Osaka (JP)

(72) Inventor: Takashi Nakatsukasa, Osaka (JP)

(73) Assignee: Keyence Corporation, Osaka (JP)

( * ) Notice: Subject to any disclaimer, the term of this patent is extended or adjusted under 35 U.S.C. 154(b) by 518 days.

(21) Appl. No.: 13/971,869

(22) Filed: Aug. 21, 2013

(65) Prior Publication Data

US 2014/0071243 A1 Mar. 13, 2014

(30) Foreign Application Priority Data

Sep. 11, 2012 (JP) ................................ 2012-199965

(51) Int. Cl.
 *H04N 13/02* (2006.01)
 *G01B 11/24* (2006.01)
 *G01B 11/25* (2006.01)

(52) U.S. Cl.
 CPC ............... *G01B 11/24* (2013.01); *G01B 11/25* (2013.01)

(58) Field of Classification Search
 CPC ............................... G01B 11/24; G01B 11/25
 USPC ........................................................ 348/46
 See application file for complete search history.

(56) References Cited

U.S. PATENT DOCUMENTS

| 2009/0022367 A1* | 1/2009 | Sasaki | .................... G01B 11/25 382/103 |
| 2009/0214092 A1* | 8/2009 | Hirsch | ................. A61B 5/0059 382/128 |

(Continued)

FOREIGN PATENT DOCUMENTS

| JP | H06-137825 A | 5/1994 |
| JP | 2000-284346 A | 10/2000 |

(Continued)

OTHER PUBLICATIONS

Bergmann, D., "New approach for automatic surface reconstruction with coded light," Remote Sensing and Reconstruction for Three-Dimensional Objects and Scenes, Proceedings, The International Society for Optical Engineering, vol. 2572, Jul. 9-10, 1995, pp. 2-9.

(Continued)

*Primary Examiner* — Allen Wong
(74) *Attorney, Agent, or Firm* — Kilyk & Bowersox, P.L.L.C.

(57) ABSTRACT

Provided is a shape measuring device capable of making a user to feel that three-dimensional shape data is easily acquirable. Right and left light projecting sections are individually turned on to automatically adjust exposure time or brightness of illumination so that an image displayed in a display section has the optimum brightness. Further, scanning is performed with a plurality of striped patterns using the light projecting section, and in synchronization therewith, a plurality of striped images are acquired by a camera. Subsequently, a 2D texture image of an object is acquired by using ring illumination or all-white uniform illumination of the light projecting section. A PC performs image processing and an analysis on the acquired image data with a measurement algorithm, to generate stereoscopic shape data. Further, a 3D texture image generated by mapping the two-dimensional texture image onto the stereoscopic shape data is displayed in a display section (monitor).

11 Claims, 23 Drawing Sheets

(56) References Cited

U.S. PATENT DOCUMENTS

| | | |
|---|---|---|
| 2010/0207938 A1 | 8/2010 | Yau et al. |
| 2011/0149068 A1* | 6/2011 | Son .................... G01B 11/245 |
| | | 348/135 |
| 2011/0191050 A1* | 8/2011 | Jeong .................... G06F 19/00 |
| | | 702/82 |
| 2011/0316978 A1 | 12/2011 | Dillon et al. |

FOREIGN PATENT DOCUMENTS

| | | |
|---|---|---|
| JP | 2000-337823 | 12/2000 |
| JP | 2002-022427 A | 1/2002 |
| JP | 2003-214824 | 7/2003 |
| JP | 2004-309240 A | 11/2004 |
| JP | 2006-284215 A | 10/2006 |
| JP | 2006-300539 A | 11/2006 |
| JP | 2007-199070 A | 8/2007 |
| JP | 2009-264862 A | 11/2009 |

OTHER PUBLICATIONS

Guhring, J., "Dense 3-D surface acquisition by structured light using off-the-shelf components," Videometrics and Optical Methods for 3D Shape Measurement, Proceedings of SPIE, The International Society for Optical Engineering, vol. 4309, Jan. 22-23, 2001, pp. 220-231.

* cited by examiner

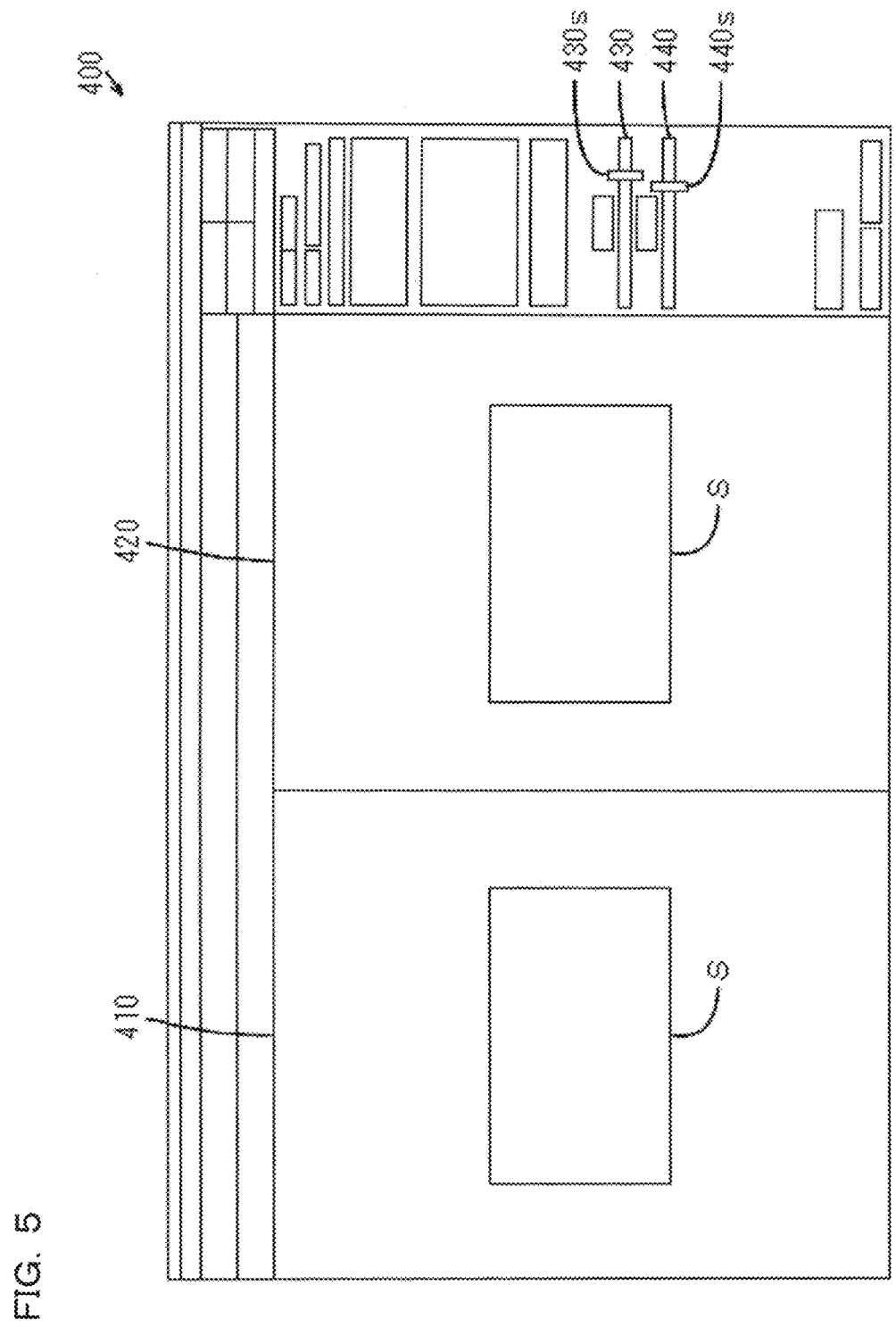

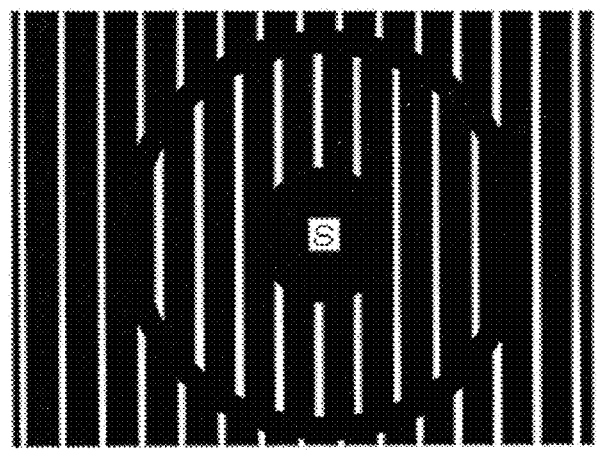
FIG. 9A
FIRST
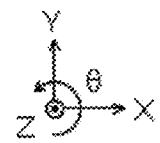
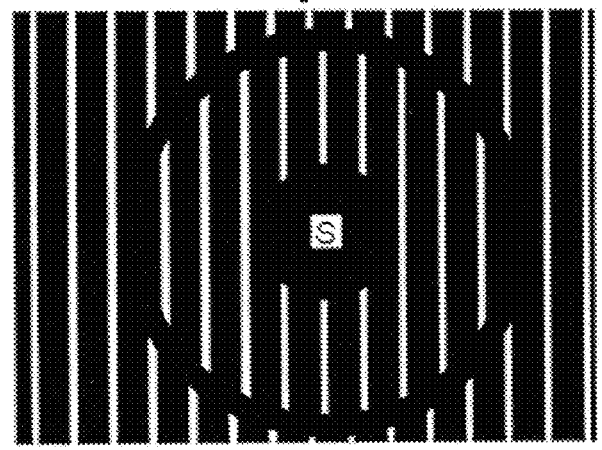
FIG. 9B
SEVENTH
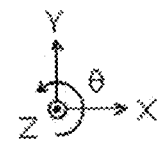
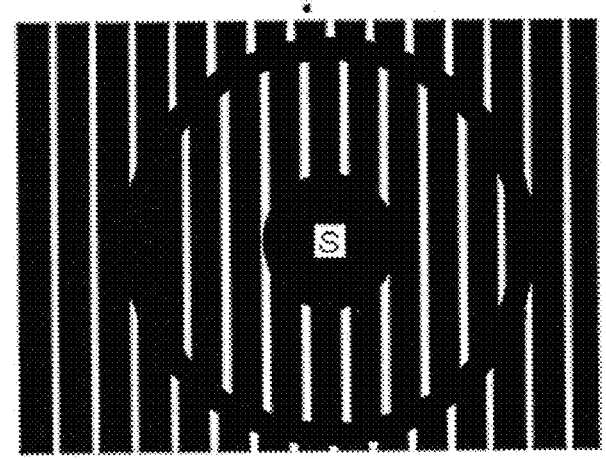
FIG. 9C
THIRTEENTH
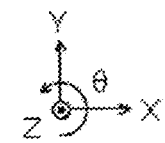

SHAPE MEASURING DEVICE, PROGRAM INSTALLED INTO THIS DEVICE, AND RECORDING MEDIUM STORING THIS PROGRAM

CROSS-REFERENCE TO RELATED APPLICATIONS

The present application claims foreign priority based on Japanese Patent Application No. 2012-199965, filed Sep. 11, 2012, the contents of which is incorporated herein by reference.

BACKGROUND OF THE INVENTION

1. Field of the Invention

The present invention relates to a shape measuring device, a program installed into this device, and a recording medium storing this program.

2. Description of the Related Art

Japanese Unexamined Patent Publication No. 2000-337823 proposes a surface inspection device preferable for simultaneously performing a two-dimensional inspection and a three-dimensional inspection to inspect a size and a pitch of a wafer bump and the presence or absence of a crack therein. Specifically, the surface inspection device disclosed in Japanese Unexamined Patent Publication No. 2000-337823 includes a two-dimensional inspection camera and a height inspection camera, and further has a coaxial epi-illumination and a plurality of laser light sources arranged around an optical axis of the two-dimensional inspection camera.

The two-dimensional inspection of a size, a pitch, a projection defect and the like of a bump are performed using coaxial epi-illumination light. On the other hand, a height is measured by a laser light sectioning method. Specifically, some of the laser light sources are arranged on a vertical plane and the other laser light sources are arranged on a tilted plane. The sheet-shaped laser light of each thereof is turned to regular reflected light or scattered light on a wafer provided with the bumps, and shot by the height inspection camera as a shape line showing the height of the wafer and the shape of the bump. Images shot by the height inspection camera and the two-dimensional inspection camera are respectively subjected to image processing, and pass/fail determination on the surface shape is performed.

Japanese Unexamined Patent Publication No. 2003-214824 proposes a measuring device capable of simultaneously recognizing a two-dimensional shape and a three-dimensional shape of an object by a single device. This measuring device is installed in association with a conveyer device (adsorption spindle) for moving a workpiece (mounted component) in an X-axis direction. The measuring device includes a camera provided with an optical axis that vertically linearly extends, and this camera includes a CCD image sensor or a CMOS image sensor. The measuring device further has a slit light source fixed to a camera support, and this slit light source irradiates the workpiece with slit light tilted with respect to the optical axis of the camera. This slit light is constituted by laser line light, but a modified example of this laser line light includes slit light generated by passing light such as LED light or a halogen lamp through a slit. A camera captures a slit light reference image and a slit light reflected image at each position to which the conveyer device is moved in the X-axis direction, to create an image including pixels of N columns and M rows. Thereafter, the image captured at each position to which the conveyer device is moved is synthesized, to acquire a full image of the workpiece. Then, a height from a measurement reference plane is calculated by a light sectioning method. A computer constituting a part of the measuring device performs three-dimensional image processing for capturing a plurality of images for a total length of the workpiece in the X-axis direction to calculate the height of the workpiece. The computer also performs two-dimensional image processing for obtaining a two-dimensional shape.

In an optical microscope, an object is enlarged for an observation, an image acquired by a camera is stored, and a variety of dimensional measurements are performed on a shot image displayed on a monitor. The optical microscope has been utilized in a variety of fields. Recently, a digital microscope has been widely used in which an image of an object is captured by a camera and displayed on a monitor to allow efficient observations, image storage, and dimensional measurements, and under the present circumstances, those who are in manufacturing fields are familiar with operations of the digital microscopes.

When three-dimensional shape data is desired to be acquired, it is necessary to prepare a required light source in the manner of adding to the digital microscope. In order to obtain three-dimensional shape data, it is necessary adjust the added light source and confirm the acquired three-dimensional shape data, and then perform a variety of dimensional measurements and analyses by using the three-dimensional shape data. However, those operations are not easy for a user unfamiliar with the three-dimensional measurement.

SUMMARY OF THE INVENTION

An object of the present invention is to provide a shape measuring device capable of making a user to feel that three-dimensional shape data is easily acquirable, a program installed into this device, and a recording medium storing this program.

According to one embodiment of the present invention, the above technical problem is solved by providing a shape measuring device including:

a light receiving section that has an observation center axis extending toward an object;

a light projecting section that irradiates the object with light obliquely from above;

a three-dimensional shape data generating unit for processing a measurement image with a predetermined algorithm to generate three-dimensional shape data, the measurement image acquired in the light receiving section while the object is irradiated using the light projecting section;

a 3D image generating unit for mapping a two-dimensional texture image of the object onto the three-dimensional shape data to generate a three-dimensional texture image, the two-dimensional texture image acquired in the light receiving section;

a display section for displaying the three-dimensional texture image generated by the 3D image generating unit; and a control unit for executing the processes of accepting a manipulation of a user to allow illumination by the light projecting section and acquire the measurement image in the light receiving section in synchronization with the illumination of the light projecting section, subsequently processing the measurement image with the predetermined algorithm to generate three-dimensional shape data, acquiring the two-dimensional texture image of the object in the light receiving section, and mapping the two-dimensional texture image onto the three-dimensional shape data to generate the three-dimensional texture image, wherein the user can select an application measurement mode capable of manually adjusting a variety of parameters related to capturing of the image of the object in the light receiving section, or a simple measurement mode capable of manually adjusting a smaller number of parameters than in the application measurement mode in terms of adjusting a variety of parameters related to capturing of the image of the object in the light receiving section.

According to the present invention, other than the application measurement mode in which the user adjusts and sets a variety of parameters as the measurement mode, the simple measurement mode which narrows down the number of parameters adjusted and set by the user is previously prepared as the measurement mode. Therefore, when the simple measurement mode is selected, a series of processes of acquiring three-dimensional shape data and displaying a three-dimensional (3D) texture image is automatically performed without troubling the user, thereby making the user to feel that the three-dimensional shape data is easily acquirable.

According to another embodiment of the present invention, the above technical problem is solved by providing a program for a shape measuring device and a recording medium storing this program, the program being applied to a shape measuring device including a light receiving section that has an observation center axis extending toward an object, a light projecting section that irradiates the object with light obliquely from above, a three-dimensional shape data generating unit for processing a measurement image with a predetermined algorithm to generate three-dimensional shape data, the measurement image acquired in the light receiving section while the object is irradiated using the light projecting section, a 3D image generating unit for mapping a two-dimensional texture image of the object onto the three-dimensional shape data to generate a three-dimensional texture image, the two-dimensional texture image acquired in the light receiving section, and a display section for displaying the three-dimensional texture image generated by the 3D image generating unit, the three-dimensional shape data generating unit and the 3D image generating unit being configured by a computer, wherein the program causes the computer to execute the steps of;

accepting a manipulation of a user to allow illumination by the light projecting section and acquire the measurement image in the light receiving section in synchronization with the illumination of the light projecting section;

subsequently processing the measurement image with the predetermined algorithm to generate three-dimensional shape data;

acquiring the two-dimensional texture image of the object in the light receiving section;

mapping the two-dimensional texture image onto the three-dimensional shape data to generate the three-dimensional texture image; and displaying a display screen for allowing the user to select an application measurement mode capable of manually adjusting a variety of parameters related to capturing of the image of the object in the light receiving section, or a simple measurement mode capable of manually adjusting a smaller number of parameters than in the application measurement mode in terms of adjusting a variety of parameters related to capturing of the image of the object in the light receiving section.

Action effects and other objects of the present invention will become apparent from detailed descriptions of preferred embodiments of the present invention.

BRIEF DESCRIPTION OF THE DRAWINGS

FIG. 5 is a view showing an example of a GUI that displays an image on two screens;

FIGS. 9A to 9C are views for explaining a third pattern of the measurement light;

DETAILED DESCRIPTION OF PREFERRED EMBODIMENTS

Embodiments

Hereinafter, preferred embodiments of the present invention will be described based on the accompanying drawings.

Figure 1:
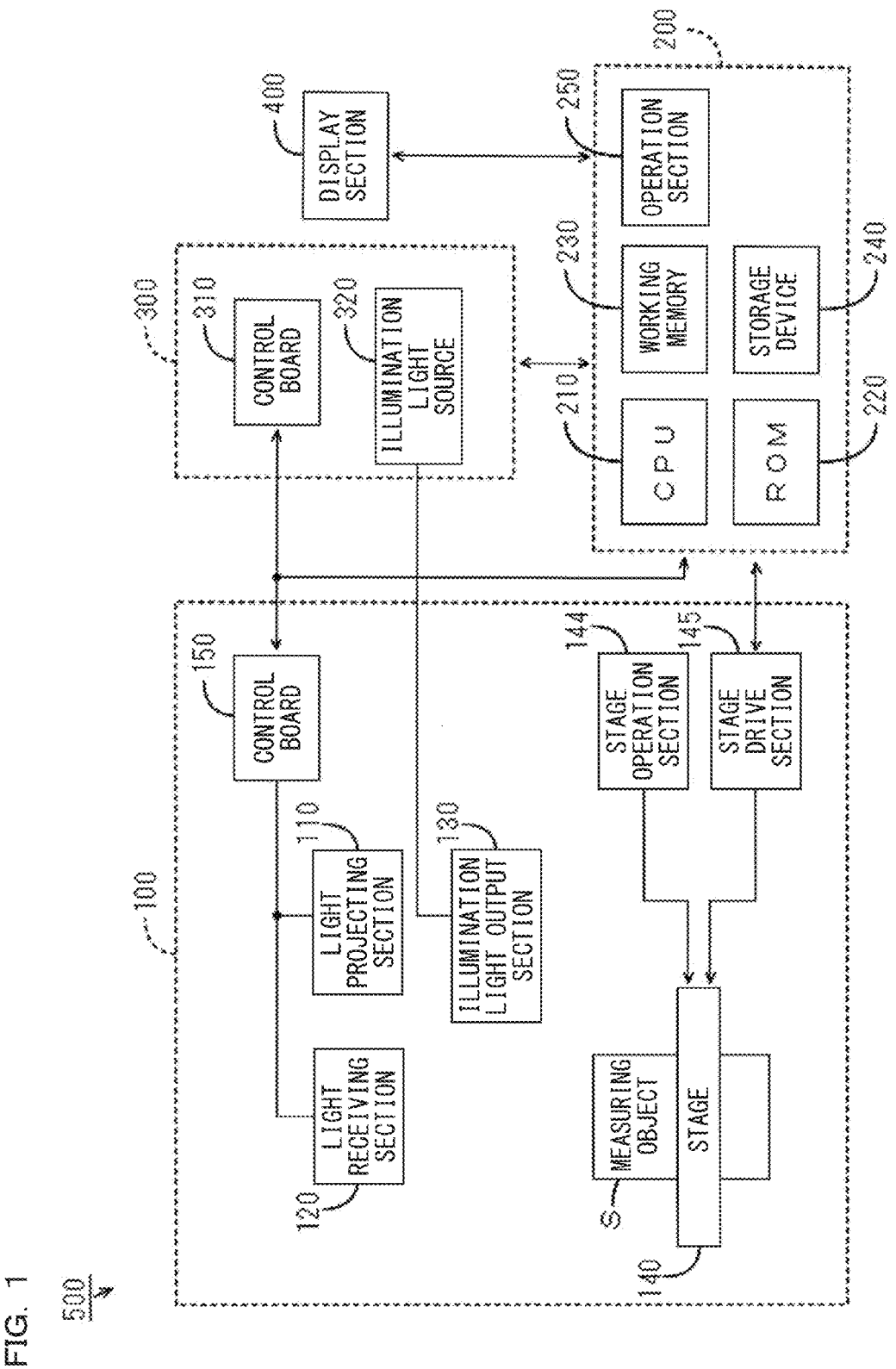
FIG. 1 is a block diagram showing a configuration of a shape measuring device, such as an optical microscope (including a digital microscope) or a surface shape measuring device, according to one embodiment of the present invention.
Figure 2:
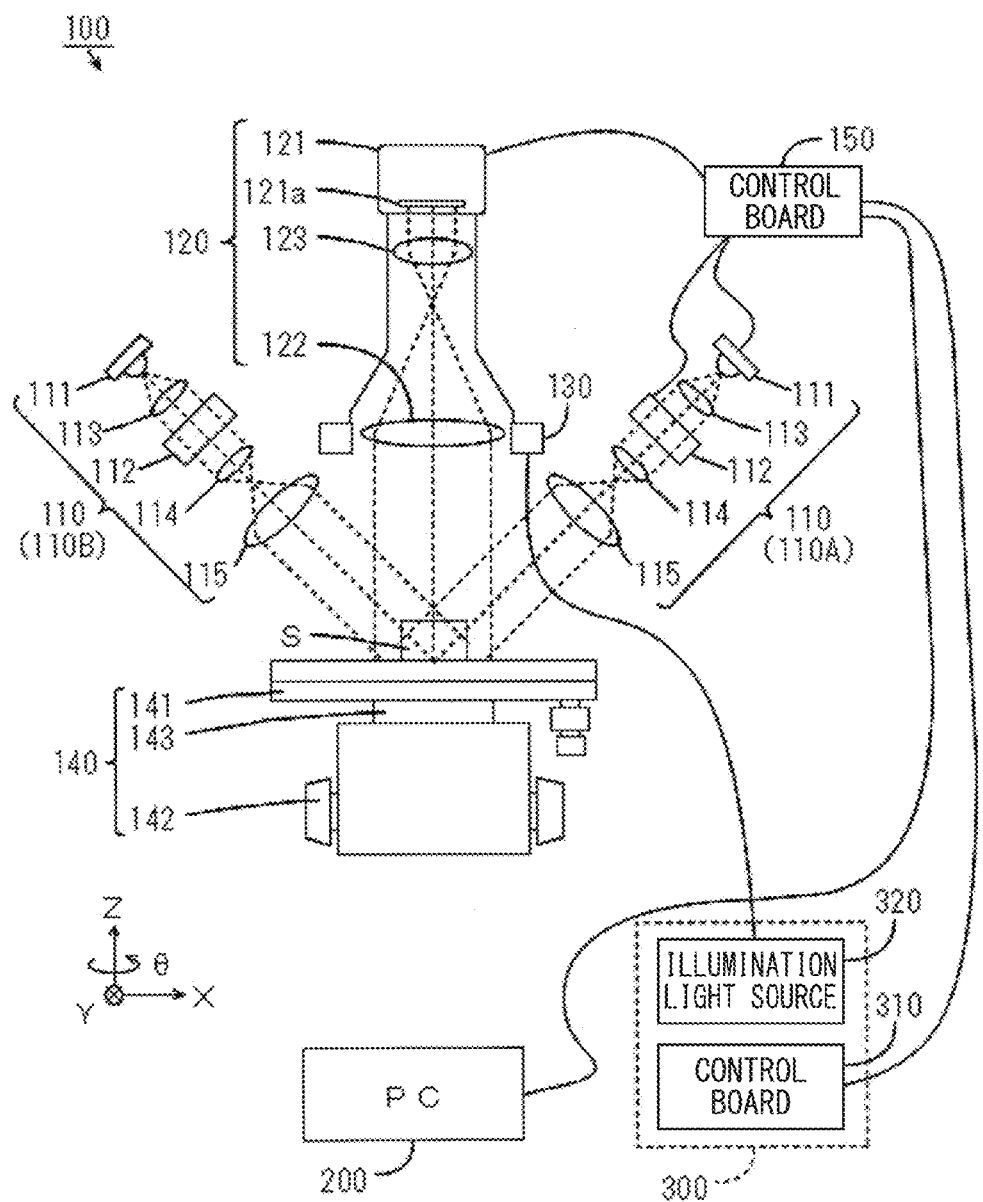
FIG. 2 is a schematic view showing a configuration of a measurement section of the shape measuring device of FIG. 1.

Overall configuration of shape measuring device of embodiment (FIGS. 1, 2, and the like):

FIG. 1 is block diagram showing a configuration of a shape measuring device 500 of an embodiment, and typical examples of the shape measuring device 500 may include an optical microscope (including a digital microscope) and a surface shape measuring device. FIG. 2 is a schematic view showing a configuration of a measurement section of the shape measuring device 500 of FIG. 1. With reference to FIGS. 1 and 2, the shape measuring device 500 is provided with a measurement section 100, a PC (personal computer) 200, a control section 300, and a display section (monitor) 400 (FIG. 1).

The measurement section 100 includes a light projecting section 110, a light receiving section 120, an illumination light output section 130, a stage 140, and a control board 150. The light projecting section 110 includes a measurement light source 111, a pattern generating section 112, and a plurality of lenses 113, 114 and 115. The light receiving section 120 includes a camera 121 and a plurality of lenses 122 and 123. A measuring object S is placed on the stage 140.

The light projecting section 110 is configured by a light projecting unit arranged obliquely above the stage 140. The light projecting section 110 irradiates a surface of a measuring object S with light obliquely from above. The measurement section 100 may include a plurality of light projecting sections 110. In the example of FIG. 2, the measurement section 100 includes two light projecting sections 110. Hereinafter, when two light projecting sections 110 are to be distinguished from each other, one light projecting section 110 is referred to as a first light projecting section 110A and the other light projecting section 110 is referred to as a second light projecting section 110B. The pair of the first and second light projecting sections 110A and 110B are arranged mirror-symmetrically with an optical axis of the light receiving section 120 placed therebetween. As the optical axis of the light receiving section 120 is irradiated with light obliquely from the light projecting section 110, a shade is formed on the measuring object S having a stereoscopic shape including irregularities. In contrast, generation of the shade can be suppressed by arranging the pair of the first and second light projecting sections 110A and 110B mirror-symmetrically.

The measurement light source 111 of each of the first and second light projecting sections 110A and 110B is typically configured by a halogen lamp that emits white light. As the measurement light source 111, another light source that emits white light, such as a white LED (light-emitting diode), may be used. Light (hereinafter referred to as measurement light) emitted from the measurement light source 111 is appropriately corrected by a lens 113, and then enters the pattern generating section 112. Herein, a telecentric optical system has been employed in each of the first and second light projecting sections 110A and 110B, and high measurement accuracy can thus be ensured. That is, in the telecentric optical system, since an image formation size of a pattern is fixed without being influenced by a distance between the lens and the object S, the pattern size remains unchanged even if a surface height of the stereoscopic object S is not fixed (e.g., irregular surface). Therefore, measurement can be performed with high accuracy.

The pattern generating section 112 is typically configured by a DMD (digital micromirror device). Herein, the DMD is a type of display element, and several hundreds of thousands of several-μm-square micromirrors are arranged like pixels, and each micromirror can independently change its tilt. With this characteristic, the light can be reflected in a direction of the optical axis (bright/ON) or polarized outward from the optical axis (dark/OFF) by means of the orientation of the micromirror. Since this micromirror can be switched between ON and OFF at a high speed of several kHz at the maximum, a brightness level can be adjusted by PWM control. That is, for example, color display with 16 bits for each of RGB colors at 60 Hz is possible. As for an illumination pattern generated by the pattern generating section 112, an arbitrary two-dimensional pattern can be generated as well as the striped pattern (FIG. 9: multi-slit method).

The pattern generating section 112 may be formed by an LCD (liquid crystal display), an LCOS (Liquid Crystal on Silicon: reflection liquid crystal element), or a mask. The measurement light incident on the pattern generating section 112 is converted into a previously set pattern and a previously set intensity (brightness), and then emitted. The measurement light emitted by the pattern generating section 112 is converted by the plurality of lenses 114 and 115 into light having a larger diameter than a visual field in which the light receiving section 120 can be observed and measured, and then applied to the measuring object S on the stage 140.

The light receiving section 120 is configured by a camera 121 and lens units 122 and 123, and is arranged above the stage 140. The light reflected by the measuring object S proceeds above the stage 140, and is collected to form an image by the plurality of lenses 122 and 123 in the light receiving section 120. This reflected light is then received by the camera 121.

The camera 121 is configured by a camera including an imaging element 121a and a lens. In the embodiment, a light-receiving lens unit of the telecentric optical system with a fixed magnification has been employed to, prioritize accuracy, but a zoom lens may be employed to make the unit usable with a wide range of magnification. The imaging element 121a is preferably configured by a monochrome imaging element such as a CCD (charge-coupled device). As the imaging element 121a, another imaging element such as a CMOS (complementary metal oxide semiconductor) image sensor may be employed. An analog electric signal (hereinafter referred to as a light-receiving signal) corresponding to a received light amount is outputted from each pixel of the imaging element 121a to the control board 150.

When a color imaging element is employed, the measurement resolution thereof is low as compared with that of the monochrome imaging element due to the need for making the respective pixels correspond to light reception for red, green, and blue, and the sensitivity deteriorates due to the need for providing a color filter in each pixel. In contrast, by employing the monochrome imaging element 121a and performing imaging by irradiation (sequential irradiation) with illumination respectively corresponding to RGB in a time-division manner from the illumination light output section 130 described below, it is possible to acquire a color image. With such a configuration, it is possible to acquire a two-dimensional color texture image of the measured object without deterioration in measurement accuracy.

Needless to say, the color imaging element may naturally be used as the imaging element 121a. In this case, although the measurement accuracy and the sensitivity deteriorate, there is no need for the time-division irradiation with RGB illumination from the illumination light output section 130, and a color image can be acquired just by irradiation with white light. Accordingly, the illumination optical system can be configured simply.

An A/D converter (analog/digital converter) and a FIFO (First In First Out) memory, which are not shown, are mounted on the control board 150. A light-receiving signal outputted from the camera 121 is sampled in a fixed sampling period and converted into a digital camera by the A/D converter on the control board 150 based on control by the control section 300. Digital signals outputted from the A/D converter are sequentially stored into the FIFO memory. The digital signals stored into the FIFO memory are sequentially transferred to a control PC 200 as pixel data.

As shown in FIG. 1, the control PC 200 includes a CPU (Central Processing Unit) 210, a ROM (Read Only Memory) 220, a working memory 230, a storage device 240, and a manipulation section 250. Further, the manipulation section 250 includes a keyboard and a pointing device. As the pointing device, a mouse, a joystick, or the like is used.

A system program is stored into the ROM 220. The working memory 230 is configured by a RAM (Random Access Memory), and is used for processing various types of data. The storage device 240 is configured by a hard disk or the like. An image processing program and a shape measurement program are stored into the storage device 240. Further, the storage device 240 is used for storing various types of data such as pixel data provided from the control board 150.

The CPU 210 generates image data based on the pixel data provided from the control board 150. Further, the CPU 210 performs various types of processing on the generated image data by using the working memory 230, and displays an image based on the image data on the display section 400. Moreover, the CPU 210 gives a driving pulse to a stage drive section 145 described below. The display section 400 is preferably configured by a thin-film display, for example, an LCD panel or an organic EL (electroluminescent) panel.

In FIG. 2, two directions, which are orthogonal to each other within a plane (hereinafter referred to as placing surface) on the stage 140 where the measuring object S is placed, are defined as an X-direction and a Y-direction and respectively indicated by arrows X and Y. A direction orthogonal to the placing surface of the stage 140 is defined as a Z-direction and indicated by an arrow Z. A direction (indicated by an arrow θ in the figure) of rotating around an axis parallel to the Z-direction is defined as a θ-direction.

The stage 140 includes an XY-stage 141, a Z-stage 142, and a θ-stage 143. The XY-stage 141 has an X-direction movement mechanism and a Y-direction movement mechanism. The Z-stage 142 has a Z-direction movement mechanism. The θ-stage 143 has a θ-direction rotation mechanism. The stage 140 is configured by these XY-stage 141, Z-stage 142, and θ-stage 143. Moreover, the stage 140 further includes a fixed member (clamp), not shown, which fixes the measuring object S to the placing surface. The stage 140 may further include a tilt stage having a mechanism rotatable around an axis parallel to the placing surface.

The X-direction movement mechanism, the Y-direction movement mechanism, the Z-direction movement mechanism, and the θ-direction rotation mechanism of the stage 140 may be each provided with a driving source capable of individually performing drive control, and typical examples of the driving source may include a stepping motor. The X-direction movement mechanism, the Y-direction movement mechanism, the Z-direction movement mechanism, and the θ-direction rotation mechanism of the stage 140 may be driven by a stage manipulation section 144 or a stage drive section 145 of FIG. 1.

The user can manually operate the stage manipulation section 144 to thereby move the placing surface of the stage 140 in the X-direction, the Y-direction or the Z-direction relatively to the light receiving section 120, or rotate the placing surface of the stage 140 in the θ-direction. By supplying a current to the stepping motor of the stage 140 based on a driving pulse given from the PC 200, the stage drive section 145 can move the stage 140 in the X-direction, the Y-direction, or the Z-direction relatively to the light receiving section 120, or rotate the stage 140 in the θ-direction.

Here, as shown in FIG. 2, a relative positional relation of the light receiving section 120, the light projecting section 110, and the stage 140 is set such that a center axis (optical axis) of each of the right and left light projecting sections 110 and a center axis (optical axis) of the light receiving section 120 intersect with each other on a focused plane of the stage 140 where light is most focused. Further, since the center of the rotational axis in the θ-direction agrees with the center axis of the light receiving section 120, when the stage 140 is rotated in the θ-direction, the measuring object is rotated around the rotational axis within the visual field without deviating from the visual field. Moreover, the X-, Y-direction movement mechanisms, θ-direction rotation mechanism, and the tilt movement mechanism are supported with respect to the Z-direction movement mechanism.

That is, the observation center axis (optical axis) of the light receiving section 120 and the movement axis in the Z-direction are not displaced even when the stage 140 is rotated in the θ-direction or tilted. With this stage mechanism, even in a state where the position or the posture of the measuring object has been changed, it is possible to move the stage 140 in the Z-direction and capture a plurality of images at different focus points, so as to synthesize the images. Note that, while the description has been made by taking as an example the electric stage which can be driven by the stepping motor in this embodiment, the stage may be a manual stage that can be only displaced manually.

The control section 300 includes a control board 310 and an illumination light source 320. The control board 310 is mounted with a CPU, not shown. The CPU of the control board 310 controls the light projecting section 110, the light receiving section 120 and the control board 150 based on an order from the CPU 210 of the PC 200.

The illumination light source 320 includes three kinds of LEDs that emits red light (R), green light (G), and blue light (B), for example. Controlling a luminance of light emitted from each LED allows generation of light of an arbitrary color from the illumination light source 320. Light (hereinafter referred to as illumination light) generated by the illumination light source 320 is outputted from a ring-shaped illumination light output section 130 through the light-guiding material (light guide). In the case of performing irradiation by use of the RGB illumination light output section 130 to generate a color image, for example, the light source of each color is sequentially switched with 300 Hz.

As the illumination light output section 130 of FIG. 2, ring-shaped illumination having an annular shape around the observation center axis is employed. This ring-shaped illumination light output section 130 is arranged above the stage 140 in the state of surrounding the light receiving section 120. The measuring object S is thus irradiated with illumination light from the illumination light output section 130 such that a shade is not formed. That is, arranging the ring-shaped illumination around the optical axis of the light receiving section 120 allows observation of the measuring object S with almost no shade being formed. Accordingly, the bottom of a hole, which cannot be observed just by the light projecting section 110 that obliquely projects light to the measuring object S, can be observed by using the ring-shaped illumination light output section 130.

FIGS. 3A to 3D and 4A to 4D are schematic views of the measuring object S in the state of being irradiated with light. In examples of FIGS. 3A to 3D and 4A to 4D, the measuring object S has a hole Sh in the substantially center of the top surface thereof. Further, in FIGS. 3A, 3C, and FIG. 4A, a shade Ss is indicated by hatching.

Figure 3A:
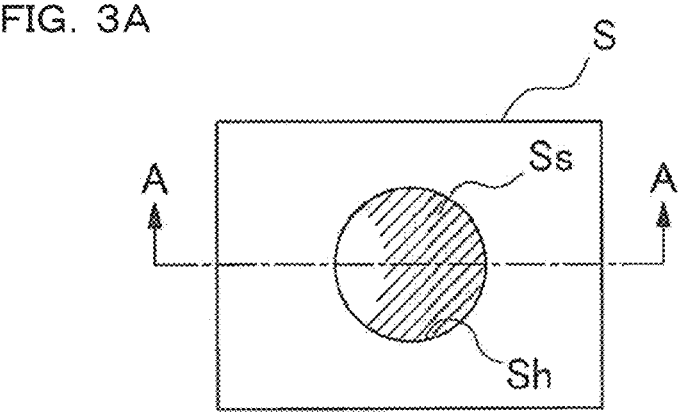
FIGS. 3A to 3D are schematic views of a measuring object in the state of being irradiated with light.
Figure 3B:
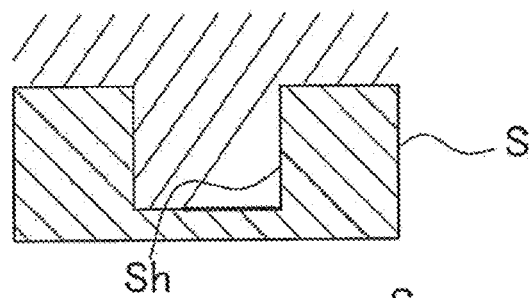

FIG. 3A is a plan view of the measuring object S in the state of being irradiated with measurement light from the first light projecting section 110A (FIG. 2), and FIG. 3B is an A-A line sectional view of FIG. 3A. As shown in FIGS. 3A and 3B, when the measuring object S is irradiated with the measurement light from the first light projecting section 110A, the measurement light does not reach the bottom of the hole Sh depending on a depth of the hole Sh, and the shade Ss is formed. Therefore, a part of the measuring object S cannot be observed.

Figure 3C:
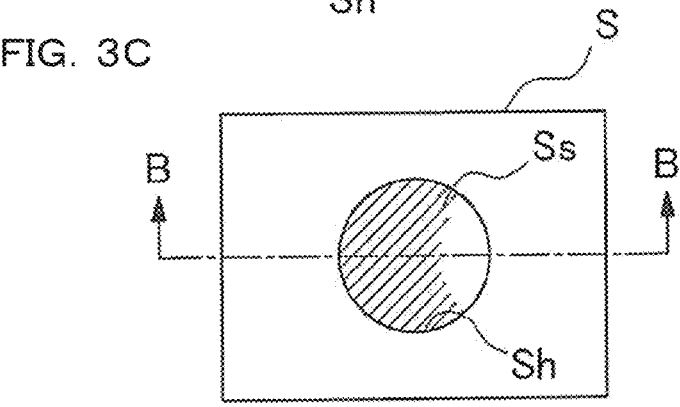
Figure 3D:
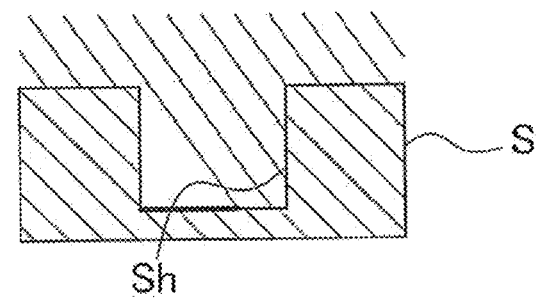

FIG. 3C is a plan view of the measuring object S in the state of being irradiated with measurement light from the second light projecting section 110B (FIG. 2), and FIG. 3D is a B-B line sectional view of FIG. 3C. As shown in FIGS. 3C and 3D, when the measuring object S is irradiated with measurement light from the second light projecting section 110B, the measurement light does not reach the bottom of the hole Sh depending on the depth of the hole Sh, and the shade Ss is formed. Therefore, a part of the measuring object S cannot be observed.

Figure 4A:
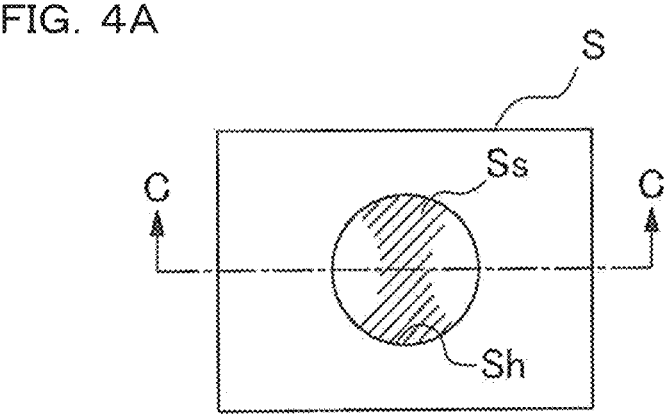
FIGS. 4A to 4D are schematic views of the measuring object in the state of being irradiated with light.
Figure 4B:
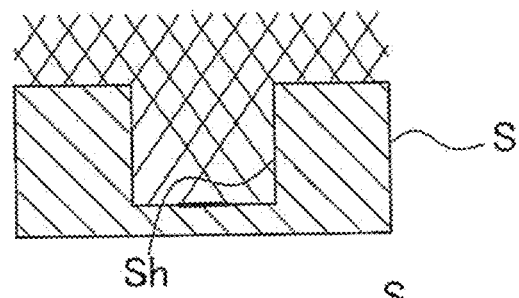

FIG. 4A is a plan view of the measuring object S in the state of being irradiated with the measurement light from both the first and second light projecting sections 110A and 110B (FIG. 2), and FIG. 4B is a C-C line sectional view of FIG. 4A. As shown in FIGS. 4A and 4B, when the measuring object S is irradiated with the measurement light from both the first and second light projecting sections 110A and 110B, the measurement light that does not reach the bottom of the hole Sh decreases as compared with the case where the measuring object S is irradiated with the measurement light from the first or second light projecting section 110A or 110B, and hence the formed shade Ss decreases. Therefore, the observable portion of the measuring object S increases.

Figure 4C:
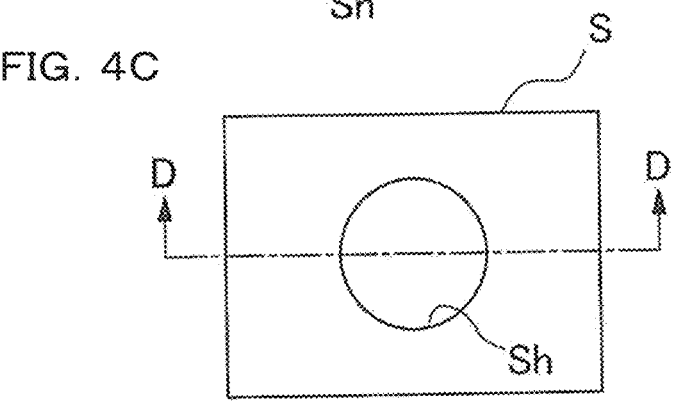
Figure 4D:
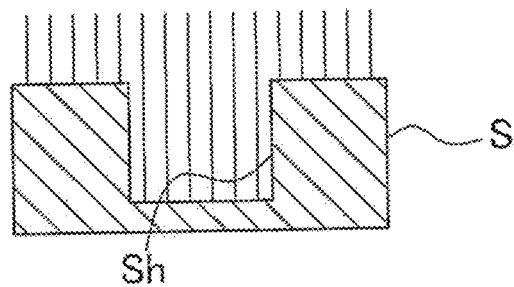

FIG. 4C is a plan view of the measuring object S in the state of being irradiated with measurement light from the illumination light output section 130 (FIG. 2), and FIG. 4D is a D-D line sectional view of FIG. 4C. As shown in FIGS. 4C and 4D, since the measuring object S is irradiated with the illumination light from substantially immediately above, the illumination light reaches the bottom of the hole Sh regardless of the depth of the hole Sh. Therefore, a large portion of the measuring object S can be observed.

An image of the measuring object S irradiated with the measurement light from the first light projecting section 110A and an image of the measuring object S irradiated with the measurement light from the second light projecting section 110B may be displayed (two-screen displayed) side by side in the display section 400.

The PC (personal computer) 200 receives camera image data transmitted from the light receiving section 120 (control board 150), to perform processing. The display section 400 functions as a monitor for controlling the shape measuring device 500, and displays a GUI for a camera shot image or a control program, and the user can perform a manipulation using input means such as a mouse or a keyboard.

FIG. 5 is a view showing an example of a GUI (Graphical User Interface) that displays an image on two screens. As shown in FIG. 5, two image display regions 410 and 420 are provided so as to be arranged side by side in the display section 400. In the case of displaying an image on two screens, the measuring object S is alternately irradiated with measurement light from the light projecting sections 110A and 110B such that the measurement light is switched. In the image display region 410, there is displayed an image of the measuring object S in the case of being irradiated with the measurement light from the first light projecting section 110A. In the image display region 420, there is displayed an image of the measuring object S in the case of being irradiated with measurement light from the second light projecting section 110B. Hence, the user can distinguish and recognize the images of the measuring object S in the case of being irradiated with the measurement light respectively from the first and second light projecting sections 110A and 110B.

Note that the frequency of switching of the measurement light between the first and second light projecting sections 110A and 110B is set to a value (e.g., several Hz or higher) to the extent that the user can at least feel that the respective images are moving images. Accordingly, the images are observed by the user such that the measuring object S is irradiated with the measurement light substantially simultaneously from both the light projecting sections 110A and 110B in the measurement section 100 and the moving images are simultaneously updated. That is, either of the respective images obtained by irradiation with the measurement light from the light projecting sections 110A and 110B is recognized by the user as if it is a moving image (live image).

Subsequently, two brightness setting bars 430 and 440 are displayed in the display section 400 with reference to FIG. 5. The brightness setting bar 430 has a slider 430s movable in a horizontal direction. The brightness setting bar 440 has a slider 440s movable in the horizontal direction. A position of the slider 430s on the brightness setting bar 430 corresponds to the brightness of the measurement light emitted from the first light projecting section 110A, or to the camera exposure time at the time of shooting an image with the measurement light from the first light projecting section 110A. A position of the slider 440s on the brightness setting bar 440 corresponds to the brightness of the measurement light emitted from the second light projecting section 110B or the camera exposure time at the time of shooting an image with the measurement light from the second light projecting section 110B.

By operating the manipulation section 250 (typically the mouse) in the PC 200 of FIG. 1 to move the slider 430s on the brightness setting bar 430 in the horizontal direction, the user can change the brightness of the measurement light emitted from the first light projecting section 110A or the camera exposure time corresponding to the first light projecting section 110A, and the result thereof is reflected to the displayed image in the display section 400 in real time. Similarly, by operating the manipulation section 250 (typically the mouse) to move the slider 440s on the brightness setting bar 440 in the horizontal direction, the user can change the brightness of the measurement light emitted from the second light projecting section 110B or the camera exposure time corresponding to the second light projecting section 110B, and the result thereof is reflected to the displayed image in the display section 400 in real time.

As described above, in the image display regions 410 and 420, images of the measuring object S in the case of being irradiated with the measurement light respectively from the light projecting sections 110A and 110B are displayed so as to be arranged side by side. Therefore, by respectively moving the positions of the sliders 430s and 440s on the brightness setting bars 430 and 440 while viewing the images of the measuring object S displayed in the image display regions 410 and 420, the user can appropriately adjust the brightness of the measurement light emitted from each of the light projecting sections 110A and 110B or the camera exposure time corresponding to each of the light projecting sections.

Further, there may be a correlation between the appropriate brightness of the measurement light emitted from each of the light projecting sections 110A and 110B and the appropriate brightness of the illumination light emitted from the illumination light output section 130, or the camera exposure time corresponding to each of the illumination. In this case, the brightness of the measurement light emitted from each of the light projecting sections 110A and 110B or the camera exposure time corresponding to each of the light projecting sections may be automatically adjusted based on the brightness of the illumination light emitted from the illumination light output section 130 or the camera exposure time corresponding to the illumination light.

Alternatively, an adjustment guide may be displayed in the display section 400. The adjustment guide makes the brightness of the measurement light emitted from each of the light projecting sections 110A and 110B or the camera exposure time corresponding to each of the light projecting sections appropriate based on the brightness of the measurement light emitted from the illumination light output section 130 or the camera exposure time corresponding to the illumination light. In this case, by respectively moving the positions of the sliders 430s and 440s on the brightness setting bars 430 and 440 based on the adjustment guide, the user can appropriately adjust the brightness of the measurement light emitted from each of the light projecting sections 110A and 110B or the camera exposure time corresponding to each of the light projecting sections.

When the light irradiation direction varies, the light reflection direction also varies, and hence the brightness of the image obtained as a result varies depending on the light irradiation direction even if the same region is irradiated. That is, the brightness of illumination or the exposure time for the imaging element, which is suitable for the measurement, varies depending on the irradiation direction. In this embodiment, the brightness of each of the images captured by irradiation with the light from the plurality of light projecting sections 110A and 110B is made individually adjustable, and hence it is possible to set appropriate brightness of illumination or exposure time with respect to each irradiation direction. Further, since the image having its brightness adjusted is displayed while being updated in each of the image display regions 410 and 420, it is possible to adjust the brightness while checking the image after the adjustment. At this time, it is also possible to more clearly display whether or not the brightness has been adjusted appropriately for the user by distinguishably displaying a portion being so bright as to be overexposed and a portion being so dark as to be underexposed in the image displayed in the image display regions 410 and 420.

Figure 6:
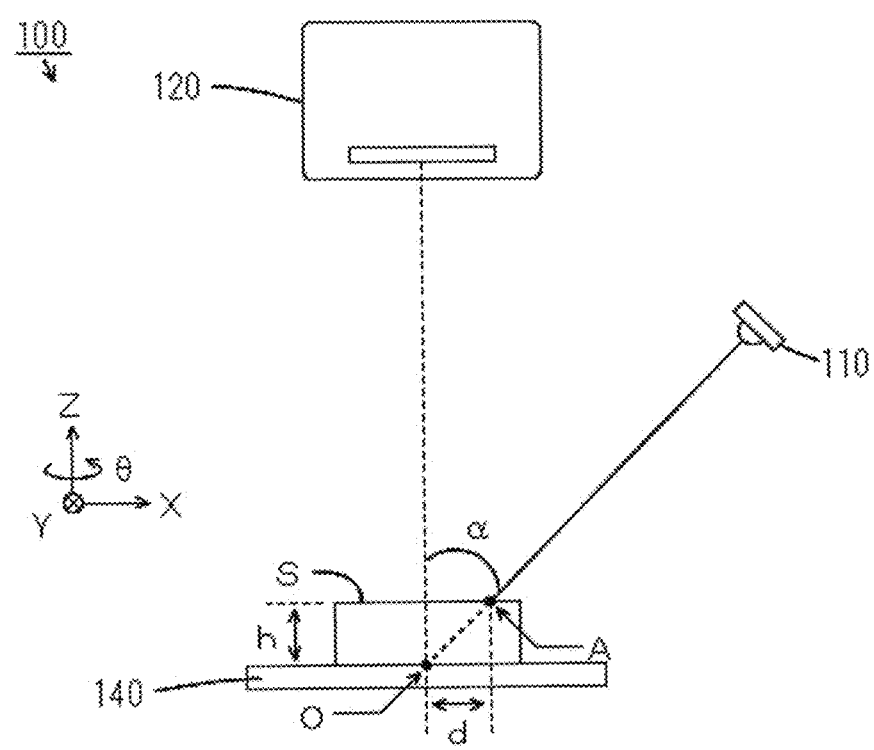
FIG. 6 is a view for explaining a principle of a triangulation system.

Shape Measurement of Measuring Object:

(1) Shape Measurement by Triangulation System (FIG. 6):

In the measurement section 100, the stereoscopic shape of the measuring object S is measured by a triangulation system. FIG. 6 is a view for explaining a principle of the triangulation system. As shown in FIG. 6, an angle α formed between the optical axis of the measurement light emitted from the light projecting section 110 and the optical axis of the measurement light entering the light receiving section 120 (the optical axis of the light receiving section 120) is previously set. The angle α is larger than 0 degrees and smaller than 90 degrees.

When the measuring object S is not placed on the stage 140, the measurement light emitted from the light projecting section 110 is reflected by a point O on the placing surface of the stage 140 and enters the light receiving section 120. On the other hand, when the measuring object S is placed on the stage 140, the measurement light emitted from the light projecting section 110 is reflected by a point A on the surface of the measuring object S and enters the light receiving section 120.

When a distance in the X-direction between the point O and the point A is denoted by symbol "d", a height h of a point A on the measuring object S with respect to the placing surface of the stage 140 is given by "h=d÷tan (α)". The CPU 210 of the PC 200 of FIG. 1 measures the distance d between the point O and the point A in the X-direction based on pixel data of the measuring object S which is provided by the control board 150. Further, the CPU 210 calculates the height h of the point A on the surface of the measuring object S based on the measured distance d. By calculating the heights of all points on the surface of the measuring object S, a three-dimensional shape of the measuring object S can be measured. However, in order to measure all the points on the surface of the measuring object S, a process such as performing raster scanning throughout the entire visual field of the measuring object S with measurement light (measured points) is necessary, and this process requires excessive time.

For this reason, there are known a light sectioning method of applying a linear irradiation pattern to the surface of the measuring object S to perform scanning in one direction, and a stripe projection method of applying a striped irradiation pattern to the surface of the measuring object S to perform scanning in one direction. Then, an object image, obtained by applying uniform illumination to the measuring object S, is mapped as surface texture information onto the three-dimensional shape data thus acquired, thereby allowing display of a three-dimensional shape of the object S in the display section 400. An irradiation pattern that can be employed to an embodiment for acquiring the three-dimensional data will be exemplarily described. Here, a typical example of mapping is specifically described. Mapping refers to acquiring three-dimensional shape measurement data and a two-dimensional texture image by using the same camera, and making data of each pixel of the two-dimensional texture image correspond to data of the same pixel of a height image obtained by three-dimensional shape measurement.

Figure 7A:
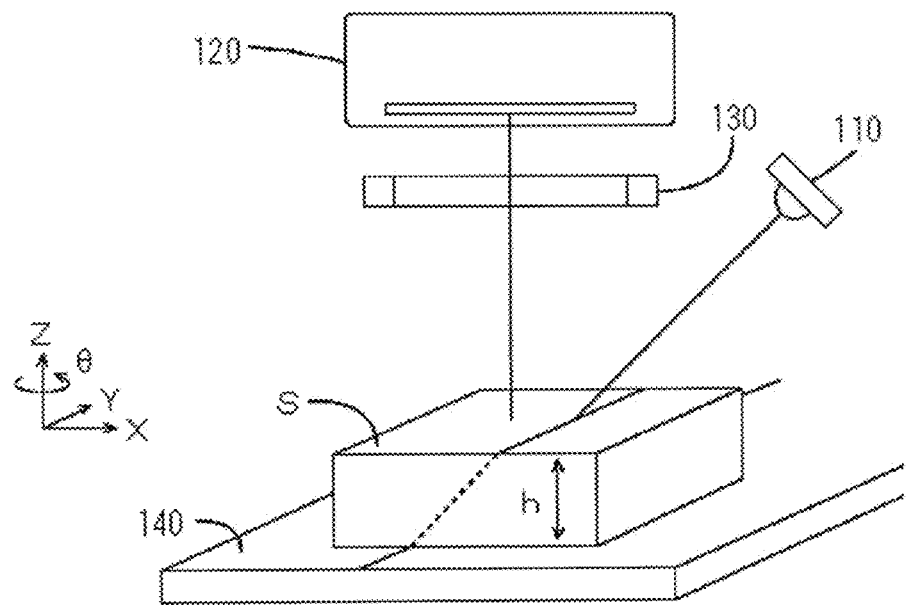
FIGS. 7A and 7B are views for explaining a first pattern of measurement light.
Figure 7B:
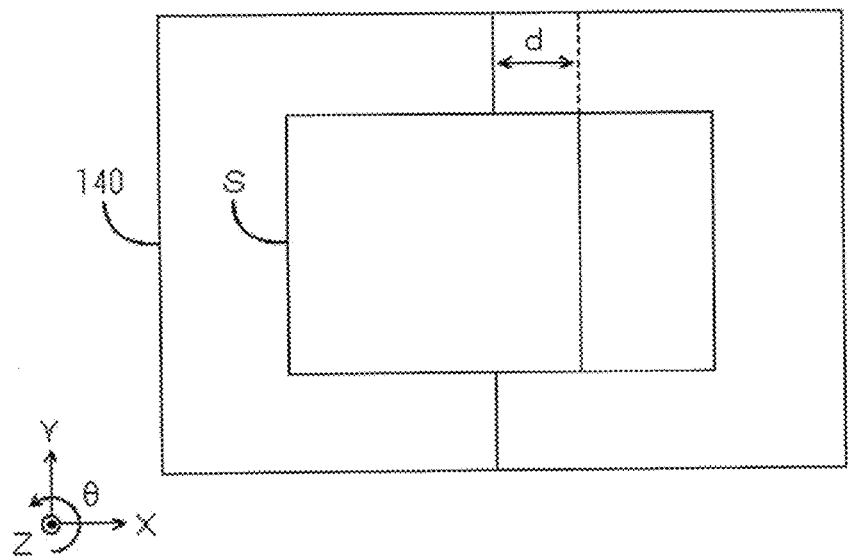

(2) First Irradiation Pattern with Measurement Light (FIG. 7: Linear Projection Method):

FIGS. 7A and 7B are views for explaining a first pattern of the measurement light. FIG. 7A shows a state where the measuring object S on the stage 140 is irradiated with the measurement light from the light projecting section 110. FIG. 7B is a plan view of the measuring object S which is irradiated with measurement light. As shown in FIG. 7A, as the first pattern, the measurement light (hereinafter referred to as linear measurement light) having a linear cross-section parallel to the Y-direction is emitted from the light projecting section 110. In this case, as shown in FIG. 7B, a portion of the linear measurement light applied on the stage 140 and a portion of the linear measurement light applied on the surface of the measuring object S are displaced from each other in the X-direction only by a distance d corresponding to the height h of the surface of the measuring object S. Therefore, the height h of the measuring object S can be calculated by measuring the distance d.

When a plurality of portions along the Y-direction on the surface of the measuring object S have different heights, the heights h of the plurality of portions along the Y-direction can be calculated by measuring the distances d with respect to the respective portions.

Further, the CPU 210 of FIG. 1 measures the distances d with respect to a plurality of portions along the Y-direction in one portion in the X-direction, and thereafter performs scanning in the X-direction with linear measurement light parallel to the Y-direction, to thereby measure the distances d with respect to the plurality of portions along the Y-direction in another position in the X-direction. Hence, the heights h of a plurality of portions of the measuring object S along the Y direction are calculated in a plurality of positions in the X-direction. By performing scanning with linear measurement light in the X-direction in a range wider than a visual field in which the light receiving section 120 is observable and measurable, it is possible to calculate the heights h of all points on the surface of the measuring object S. It is thus possible to acquire three-dimensional shape data of the measuring object S.

Figure 8:
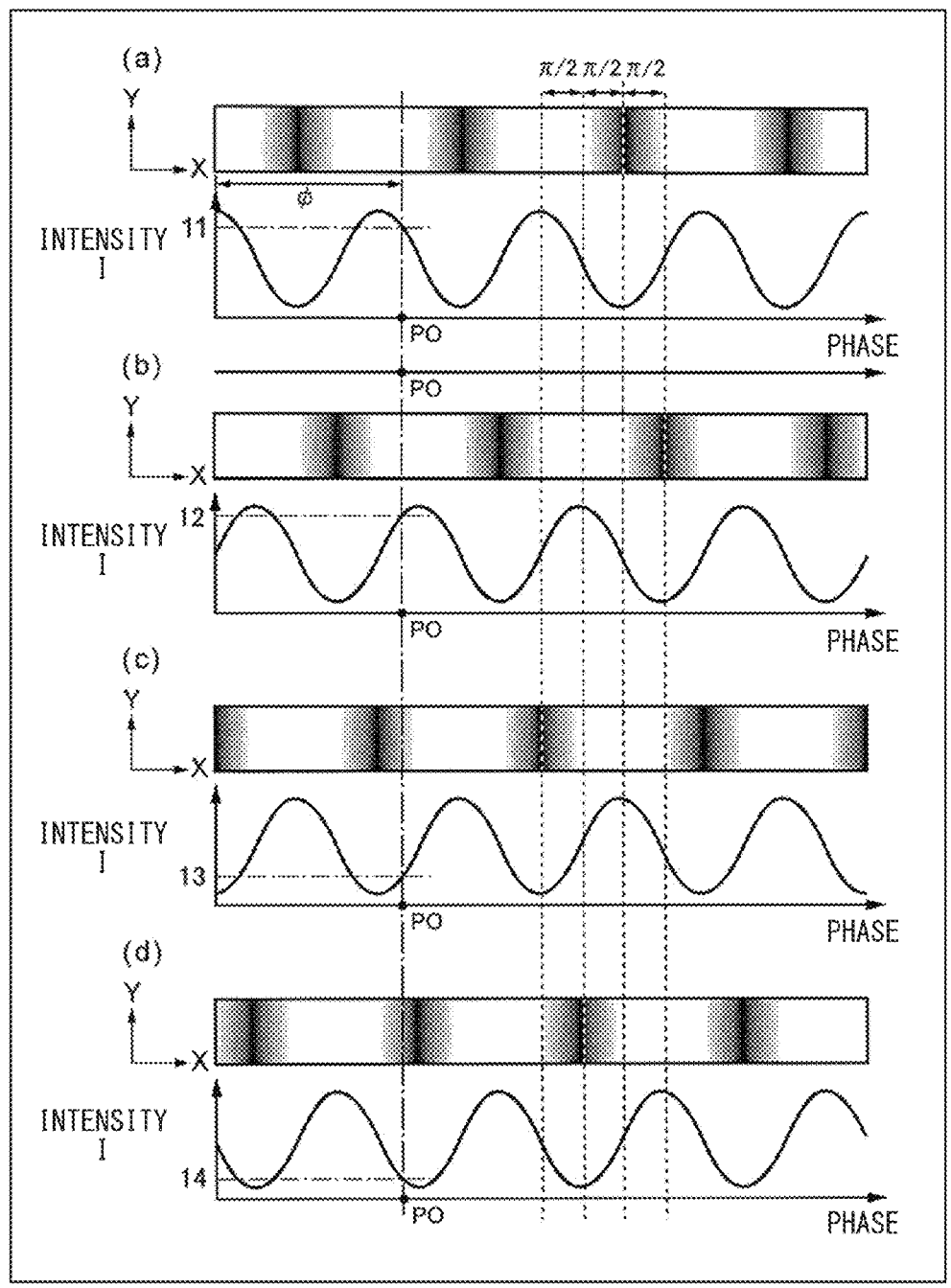
FIGS. 8A to 8D are views for explaining a second pattern of the measurement light.

(3) Second Irradiation Pattern with Measurement Light (FIG. 8: Sinusoidal Phase Shift Method):

FIGS. 8A to 8D are views for explaining a second pattern of the measurement light. As shown in FIGS. 8A to 8D, as the second pattern, the measurement light (hereinafter referred to as sinusoidal measurement light), which has a linear cross-section parallel to the Y-direction and has a pattern in which an intensity changes in a sign wave shape in the X-direction, is emitted from the light projecting section 110 a plurality of times (four times in this example). In the sinusoidal phase shift method, the height h can be obtained by three times of shooting at the minimum. As described later, there is an advantage of making a calculation formula very simple when the phase is shifted by 90 degrees ($\pi/2$) each and shooting is performed four times.

FIG. 8A shows sinusoidal measurement light emitted for the first time. The intensity of the sinusoidal measurement light emitted for the first time has an initial phase $\phi$ in an arbitrary position PO on the surface of the measuring object S. By emission of this sinusoidal measurement light, light reflected by the surface of the measuring object S is received by the light receiving section 120. The intensity of the received light is measured based on the pixel data of the measuring object S. The intensity (luminance) of the light reflected by an arbitrary portion PO on the surface of the measuring object S is taken as I1.

FIG. 8B shows sinusoidal measurement light emitted for the second time. The intensity of the sinusoidal measurement light emitted for the second time has a phase ($\phi+\pi/2$) in the arbitrary position PO on the surface of the measuring object S. By emission of this sinusoidal measurement light, light reflected by the surface of the measuring object S is received by the light receiving section 120. The intensity of the received light is measured based on the pixel data of the measuring object S. The intensity (luminance) of the light reflected by the portion PO on the surface of the measuring object S is taken as I2.

FIG. 8C shows sinusoidal measurement light emitted for the third time. The intensity of the sinusoidal measurement light emitted for the third time has a phase ($\phi+\pi$) in the arbitrary position PO on the surface of the measuring object S. By emission of this sinusoidal measurement light, light reflected by the surface of the measuring object S is received by the light receiving section 120. The intensity of the received light is measured based on the pixel data of the measuring object S. The intensity (luminance) of the light reflected by the portion PO on the surface of the measuring object S is taken as I3.

FIG. 8D shows sinusoidal measurement light emitted for the fourth time. The intensity of the fourth sinusoidal measurement light has a phase ($\phi+3\pi/2$) in the arbitrary position PO on the surface of the measuring object S. By emission of this sinusoidal measurement light, light reflected by the surface of the measuring object S is received by the light receiving section 120. The intensity of the received light is measured based on the pixel data of the measuring object S. The intensity (luminance) of the light reflected by the portion PO on the surface of the measuring object S is taken as I4.

The initial phase $\phi$ is given by: $\phi=\tan^{-1}[(I1-I3)/(I2-I4)]$. Using this four-point method eliminates the need for knowing an amplitude of the sine wave as an original and a luminance center, and the height h of the arbitrary portion of the measuring object S can be calculated by obtaining the initial phases $\phi$ from the measured I1 to I4. More specifically, in the arbitrary position PO on the surface of the measuring object S, the height h is calculated by obtaining a phase difference (corresponding to the distance d of FIG. 6) between an initial phase $\phi$o when the object S is not present and an initial phase $\phi$s shifted due to the presence of the object S. That is, according to this system, four times of measurement of the intensities of light allows high-speed and simple calculation of the initial phase $\phi$ of all portions of the measuring object S. Note that the initial phase $\phi$ can be calculated by applying measurement light with different phases at least three times and measuring intensities (luminances) of the received light. Then, by calculating the heights h of all points on the surface of the measuring object S, the three-dimensional shape of the measuring object S can be measured. According to this sinusoidal phase shift method, the number of shot images is at least three and stereoscopic information can be obtained by a small number of shooting. Hence, there is an advantage that the three-dimensional shape data can be acquired at high speed.

(4) Third Irradiation Pattern with Measurement Light (FIG. 9: Multi-Slit Method):

FIGS. 9A to 9C are views for explaining a third pattern of the measurement light. As shown in FIGS. 9A to 9D, as the third pattern, a plurality of pieces of striped pattern measurement light (hereinafter referred to as striped measurement light) having linear cross-sections parallel to the Y-direction and aligned in the X-direction are emitted from the light projecting section 110 a plurality of times (sixteen times in this example). That is, a plurality of shooting operations are performed by moving the illumination pattern with a narrower pitch than a slit width. In the embodiment, a combination of this multi-slit method and a later-described space coding method has been employed.

In the striped measurement light, a linear bright portion parallel to the Y-direction and a linear dark portion parallel to the Y-direction are periodically aligned in the X-direction. Here, when the pattern generating section 112 is a DMD, a size of the micromirror is taken as one unit. A width of each bright portion of the striped measurement light in the X-direction is, for example, three units and a width of each dark portion of the striped measurement light in the X-direction is, for example, thirteen units. In this case, a period of the striped measurement light in the X-direction is sixteen units. Note that the units of the bright portion and the dark portion vary depending on the configuration of the pattern generating section 112 of FIG. 2. For example, when the pattern generating section 112 is liquid crystal, one unit is a size of one pixel.

By emission of the first striped measurement light, light reflected by the surface of the measuring object S is received by the light receiving section 120. The intensity of the received light is measured based on pixel data of the first shot image of the measuring object S. FIG. 9A is the first shot image of the measuring object S which corresponds to the first striped measurement light.

The second striped measurement light has a pattern in which the bright portion and the dark portion of the first striped measurement light are moved only by one unit in the X-direction. By emission of the second striped measurement light, light reflected by the surface of the measuring object S is received by the light receiving section 120. Intensity of the received light is measured based on pixel data of a second shot image of the measuring object S.

The third striped measurement light has a pattern in which the bright portion and the dark portion of the second striped measurement light are moved only by one unit in the X-direction. By emission of the third striped measurement light, light reflected by the surface of the measuring object S is received by the light receiving section 120. The intensity of the received light is measured based on pixel data of the third shot image of the measuring object S.

Through repetition of similar operations, light intensities corresponding to the fourth to sixteenth striped measurement light are respectively measured based on pixel data of the fourth to sixteenth shot images of the measuring object S. When the striped measurement light having a period of sixteen units in the X-direction is emitted sixteen times, all portions on the surface of the measuring object S are irradiated with the striped measurement light. FIG. 9B is the seventh shot image of the measuring object S which corresponds to the seventh striped measurement light. FIG. 9C is the thirteenth shot image of the measuring object S which corresponds to the thirteenth striped measurement light.

Figure 10:
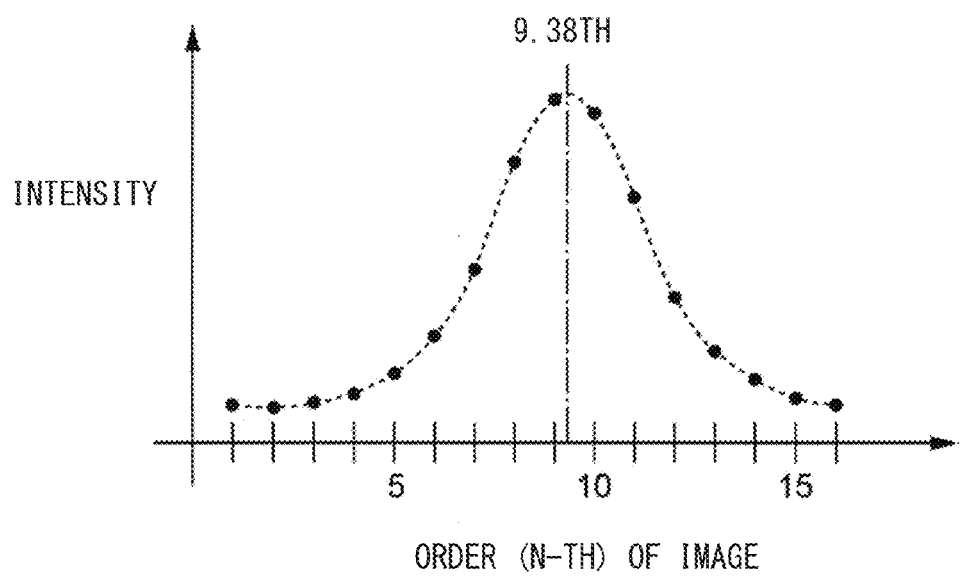
FIG. 10 is a diagram showing the relation between the pixel data (intensity of received light) on a specific portion of the measuring object and the order (n-th) of an image from which the pixel data has been obtained.

FIG. 10 is a diagram showing the relation between the timing (n-th) when an image of a specific portion of the measuring object S is shot and the intensity of the received light. A lateral axis of FIG. 10 indicates the number of the shot image, and a longitudinal axis thereof indicates the intensity of the received light. As described above, the first to sixteenth shot images are generated as to the measuring object S. Further, the intensities (luminances) of light corresponding to the respective pixels of the generated first to sixteenth shot images are measured.

As shown in FIG. 10, the intensities (luminances) of the light in the respective portions inside the image corresponding to the number of the shot image are illustrated, to thereby obtain a scatter diagram. By fitting, for example, a Gaussian curve, a spline curve, or a parabola to the obtained scatter diagram, it is possible to estimate the number (n-th) of the shot image when the light intensity is the maximum with accuracy of less than 1. In the example of FIG. 10, it is estimated from the fitted curve indicated by dots that the light intensity is the maximum in a 9.38-th shot image (such a shot image does not actually exist but exists only in calculating estimation) between the ninth and tenth shot images.

Further, the maximum value of the light intensity can also be estimated by means of the fitted curve. Based on the number of the shot image whose light intensity is the maximum out of the light intensities estimated in the respective portions of the measuring object S, this number is multiplied by a numerical value indicating how many µM one unit of the micromirror corresponds to on the measuring object S, to obtain a distance corresponding to "d" of FIG. 6, and based on this value d, the heights h of the respective portions of the measuring object S can be calculated (h=d÷tan(α)). According to this method, it is possible to measure the three-dimensional shape of the measuring object S based on the intensity of light whose S/N (signal/noise) ratio is sufficiently large, so as to improve the accuracy in shape measurement of the measuring object S.

In the shape measurement of the measuring object S using the periodic light projection pattern of the sinusoidal measurement light or the striped measurement light, a relative height (relative value of the heights) of the respective portion on the surface of the measuring object S is measured. This is because an absolute phase is not obtained since individual peripheral stripes cannot be distinguished and the uncertainty exists corresponding to an integral multiple of one period ($2\pi$) of the stripe. For this reason, based on the assumption that the height of one portion of the measuring object S and the height of a portion adjacent thereto successively change, a known unwrapping process may be performed on data of the measured heights.

According to this multi-slit method, the number of shot images is 16 in the case of a period of sixteen pixels, slit light with a width of three pixels and a movement pitch of one pixel. When the shooting timing (n-th image) with the maximum luminance is obtained by interpolation calculation for each pixel, data with high luminance is constantly used, thereby facilitating stable improvement in accuracy.

Figure 11:
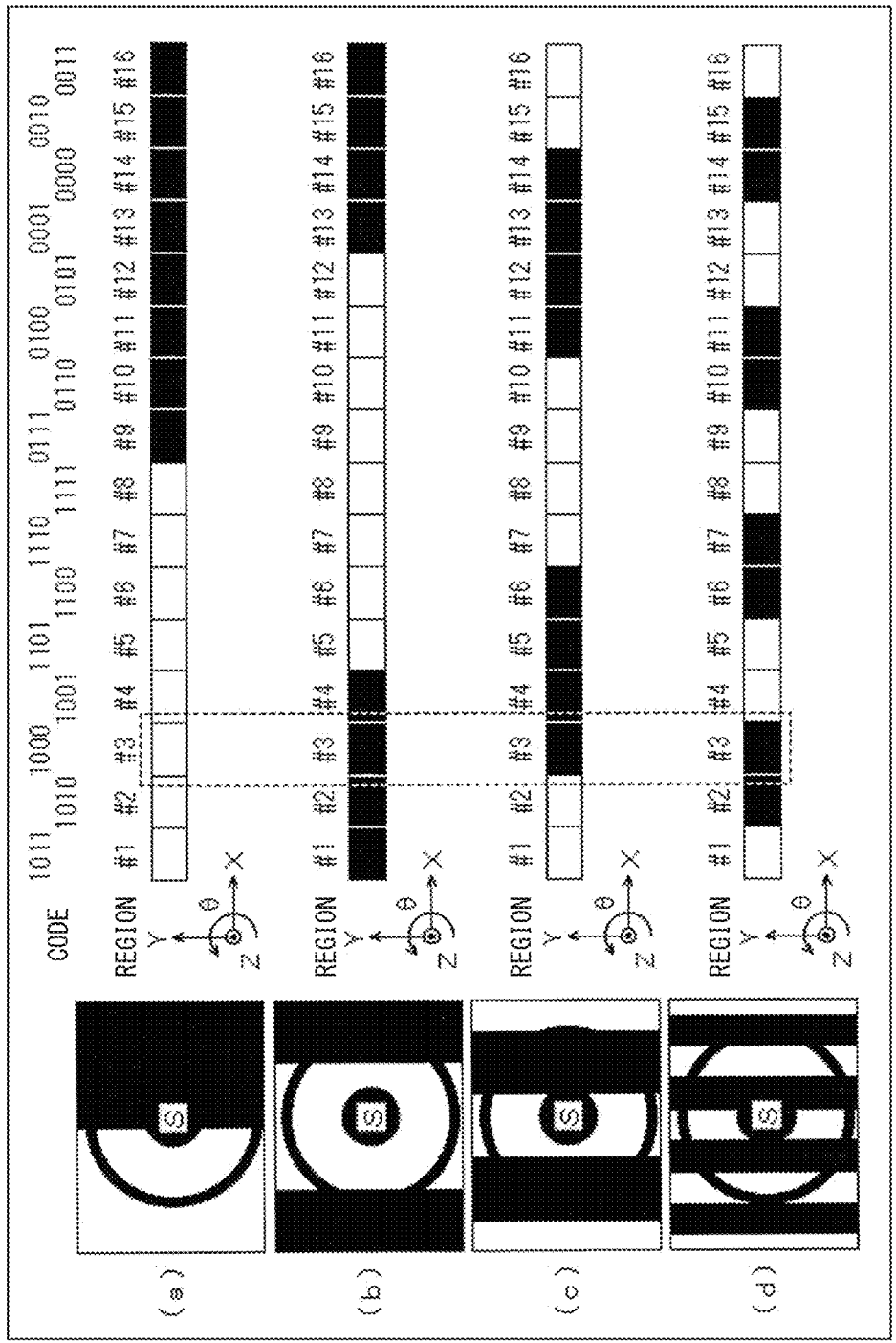
FIGS. 11A to 11D are views for explaining a fourth pattern of the measurement light.

(5) Fourth Irradiation Pattern with Measurement Light (FIG. 11: Space Coding Method):

FIGS. 11A to 11D are views for explaining a fourth pattern of the measurement light. As shown in FIG. 11A, as the fourth pattern, the measurement light (hereinafter referred to as coded measurement light) having a linear cross-section parallel to the Y-direction and having bright portions and dark portions aligned in the X-direction is emitted from the light projecting section 110 a plurality of times (four times in this example). A ratio of each of the bright portions and the dark portions of the coded measurement light is 50%.

In the embodiment, the surface of the measuring object S is divided into a plurality of (16 in the example of FIG. 11) regions in the X-direction. Hereinafter, the plurality of regions of the measuring object S divided in the X-direction are respectively referred to as first to sixteenth regions.

FIG. 11A shows coded measurement light emitted for the first time. The coded measurement light emitted for the first time has bright portions with which the first to eighth regions of the measuring object S are irradiated. Further, the coded measurement light emitted for the first time has dark portions with which the ninth to sixteenth regions of the measuring object S are irradiated. Hence, in the coded measurement light emitted for the first time, the bright portions and the dark portions are parallel to the Y-direction and aligned in the X-direction. Further, a ratio of each of the bright portions and the dark portions of the coded measurement light emitted for the first time is 50%.

FIG. 11B shows coded measurement light emitted for the second time. The coded measurement light emitted for the second time has bright portions with which the fifth to twelfth regions of the measuring object S are irradiated. Moreover, the coded measurement light emitted for the second time has dark portions with which the first to fourth and thirteenth to sixteenth regions of the measuring object S are irradiated. Hence, in the coded measurement light emitted for the second time, the bright portions and the dark portions are parallel to the Y-direction and aligned in the X-direction. Further, a ratio of each of the bright portions and the dark portions of the coded measurement light emitted for the second time is 50%.

FIG. 11C shows coded measurement light emitted for the third time. The coded measurement light emitted for the third time has bright portions with which the first, second, seventh to tenth, fifteenth and sixteenth regions of the measuring object S are irradiated. Moreover, the coded measurement light emitted for the third time has dark portions with which the third to sixth and eleventh to fourteenth regions of the measuring object S are irradiated. Hence in the coded measurement light emitted for the third time, the bright portions and the dark portions are parallel to the Y-direction and aligned in the X-direction. Further, a ratio of each of the bright portions and the dark portions of the coded measurement light emitted for the third time is 50%.

FIG. 11D shows coded measurement light emitted for the fourth time. The coded measurement light emitted for the fourth time has bright portions with which the first, fourth, fifth, eighth, ninth, twelfth, thirteenth, and sixteenth regions of the measuring object S are irradiated. Moreover, the coded measurement light emitted for the fourth time has dark portions with which the second, third, sixth, seventh, tenth, eleventh, fourteenth, and fifteenth regions of the measuring object S are irradiated. Hence, in the coded measurement light emitted for the fourth time, the bright portions and the dark portions are parallel to the Y-direction and aligned in the X-direction. Further, a ratio of each of the bright portions and the dark portions of the coded measurement light emitted for the fourth time is 50%.

A logic "1" is allocated to the bright portion of the coded measurement light, and a logic "0" is allocated to the dark portion of the coded measurement light. Further, alignment of the logic of each of the first to fourth coded measurement light applied to each region of the measuring object S is referred to as a code. In this case, the first region of the measuring object S is irradiated with coded measurement light with a code "1011". Hence, the first region of the measuring object S is coded to the code "1011".

The second region of the measuring object S is irradiated with coded measurement light with a code "1010". Hence, the second region of the measuring object S is coded to the code "1010". The third region of the measuring object S is irradiated with coded measurement light with a code "1000". Hence, the third region of the measuring object S is coded to the code "1000". Similarly, the sixteenth region of the measuring object S is irradiated with coded measurement light with a code "0011". Hence, the sixteenth region of the measuring object S is coded to the code "0011".

As described above, between adjacent regions of the measuring object S, the measuring object S is irradiated a plurality of times with coded measurement light having codes different from each other only by "1" in any digit of each of the codes. That is, the measuring object S is irradiated a plurality of times with the coded measurement light so as to change the bright portion and the dark portion into grey-coded pattern.

The light reflected by each region of the surface of the measuring object S is received by the light receiving section 120. Coded measurement light images (four images in this example) are generated by the received light, and a code of each region is measured from these images. A difference between this code and a code when the measuring object S is not present is obtained with respect to each region, to thereby obtain a distance corresponding to "d" of FIG. 6. At this time, an absolute value of "d" is obtained from the characteristic of the coding method that the foregoing code appears only once in the X-axis direction inside the image. From this value, an absolute height (absolute value of the height) in the region of the measuring object S is calculated. By calculating the heights of all regions on the surface of the measuring object S, the three-dimensional shape of the measuring object S can be measured.

In the above description, the surface of the measuring object S is divided into sixteen regions in the X-direction and the coded measurement light is emitted from the light projecting section 110 four times, but the present invention is not limited thereto. The surface of the measuring object S may be divided into $2^N$ (N is a natural number) regions in the X-direction and coded measurement light may be emitted from the light projecting section 110 N times. In the above description, N is set to 4 for the sake of easy understanding. In the shape measurement processing in this embodiment, N is set to 8, for example. Therefore, the surface of the measuring object S is divided into 256 regions in the X-direction.

In the shape measurement of the measuring object S using the coded measurement light, the minimum distance dividable with a stripe used as a code, i.e., a distance corresponding one pixel, is the minimum resolution. Accordingly, when the number of pixels in a visual field of the light receiving section 120 in the X-direction is 1024, the measuring object S with a height of 10 mm, for example, can be measured by a resolution of: 10 mm÷1024≈10 µm. In the embodiment, the three-dimensional shape data is generated using an algorithm obtained by combining the shape measurement using this coded measurement light (in which an absolute value is obtained but a resolution falls short) with the foregoing multi-slit method. As a modified example, the three-dimensional shape data may be generated using an algorithm obtained by combining the foregoing coding method with the sinusoidal phase shift method. By combining the coding method with the multi-slit method or the sinusoidal phase shift method in which only a relative value is obtained but a resolution is high, it is possible to calculate an absolute value of the distance d of the measuring object S with a higher resolution.

In particular, in the shape measurement of the measuring object S using the striped measurement light of FIG. 9, the resolution may be 1/100 pixel. When the number of pixels in the visual field of the light receiving section 120 in the X-direction is 1024, the resolution of the 1/100 pixel corresponds to dividing the surface of the measuring object S into about 100000 regions in the X-direction (i.e., N≈17).

According to the shape measurement method using this coded measurement light, there is an advantage that an absolute phase can be obtained, but a resolution is relatively low. Therefore, by combining the space coding method, in which an absolute phase can be found, with the sinusoidal phase shift method or the multi-slit method, in which only a relative phase can be obtained, it is possible to obtain a method in which a resolution is high and an absolute value can be obtained. That is, by combining the shape measurement using coded measurement light with the shape measurement using striped measurement light, the absolute value of the height of the measuring object S can be calculated with a further higher resolution.

The foregoing method of scanning the measuring object with linear measurement light (first irradiation pattern: FIG. 7) is generally called a light sectioning method. Meanwhile, the method of applying sinusoidal measurement light (second irradiation pattern: FIG. 8), the method of applying striped measurement light (third irradiation pattern: FIG. 9), or the method of applying coded measurement light (fourth irradiation pattern: FIG. 11) is classified as a pattern projection method. Moreover, among the pattern projection methods, the method of applying sinusoidal measurement light and the method of applying striped measurement light are classified as the phase shift method, and the method of applying coded measurement light is classified as the space coding method.

In the sinusoidal phase shift method (second and third irradiation patterns: FIGS. 8 and 9), at the time of irradiation with a sine wave or a plurality of slit light beams as a periodic projection pattern, the height of the measuring object S is obtained from a phase difference between a phase calculated based on an amount of received light reflected from a reference height position when the measuring object S is not present and a phase calculated based on an amount of received light reflected from the surface of the measuring object S when the measuring object S is present. The phase shift method has a disadvantage that an absolute phase is not obtained since individual peripheral stripes cannot be distinguished and the uncertainty exists corresponding to an integral multiple of one period ($2\pi$) of the stripe. However, the phase shift method has an advantage that the measurement time is relatively short since the number of acquired images is small as compared with the light sectioning method and the measurement resolution is high. On the other hand, in the space coding method (fourth irradiation pattern: FIG. 11), a code having changed due to the presence of the object S is obtained in each region of the object, and an absolute height of the object can be obtained by obtaining a difference between this code and a code when the object S is not present with respect to each region. Although the space coding method also has the advantage that measurement can be performed by a relatively small number of images and an absolute height can be obtained, this method has its limits on the measurement resolution as compared with the sinusoidal phase shift method.

Although these projection methods have respective advantages and disadvantages, they both use a triangulation principle. In the embodiment, the algorithm obtained by combining the third irradiation pattern (FIG. 9: multi-slit method) with the space coding method (FIG. 11) has been employed as described above, but the sinusoidal phase shift method may be employed in place of the multi-slit method to employ an algorithm obtained by combining this sinusoidal phase shift method with the space coding method.

The shape measuring device 500 of the embodiment performs imaging by using in different purposes the ring-shaped RGB illumination light output section 130 which applies light immediately downward and the light projecting section 110 which applies light obliquely. When the object S is to be only observed, the illumination of the RGB illumination light output section 130 or the illumination of the light projecting section 110 is selected or are used together, to allow observation of the object S in the optimally illuminated state. When a 3D texture image is to be generated, a color image (two-dimensional texture image) that is shot using the ring-shaped RGB illumination light output section 130 is acquired, and three-dimensional stereoscopic data that is measured using the light projecting section 110 is acquired. Then, a 3D texture image generated by mapping the two-dimensional texture image onto the three-dimensional stereoscopic data is displayed in the display section 400. The 3D texture image displayed in the display section 400 is an image that faithfully reproduces a stereoscopic outline at the time of viewing the measuring object S, and this realistic 3D texture image data can be observed from an arbitrary direction, measured, and analyzed by use of an arbitrary program installed in the PC 200.

In other words, with the conventional optical microscope, a clear image of the measuring object can be displayed on the monitor, but it lacks a stereoscopic feeling and a realistic feeling since it is a two-dimensional (2D) image. In contrast, according to the shape measuring device 500 of the embodiment, since a clear three-dimensional (3D) texture image is displayed on the monitor, a realistic feeling can be provided to the user observing this image. Accordingly, the shape measuring device 500 of the embodiment is capable of giving the user, who has viewed an instant display of the realistic 3D texture image, a surprise that the realistic 3D texture image is instantly displayed on the monitor, while giving a surprise that the object S is displayed as if it has been directly taken into the display section 400 of the PC 200.

In the embodiment, the telecentric optical system is employed to the light projecting section 110 and the light receiving section 120, so that an optical image of the object S is formed with extremely low distortion, and the monochrome imaging element is employed to the imaging element 121a, so that a high-quality image with high sensitivity and a high S/N ratio is acquired. From this image, highly accurate three-dimensional shape data can be generated. Similarly, an illumination image (2D texture image) by the illumination light output section 130 can be acquired with high quality through the common light receiving section 120. Then, the three-dimensional shape data is combined with the 2D (two-dimensional) texture image, to generate a high-quality 3D (three-dimensional) texture image. It goes without saying that this high-quality 3D texture image is provided with the foregoing reality.

Figure 15:
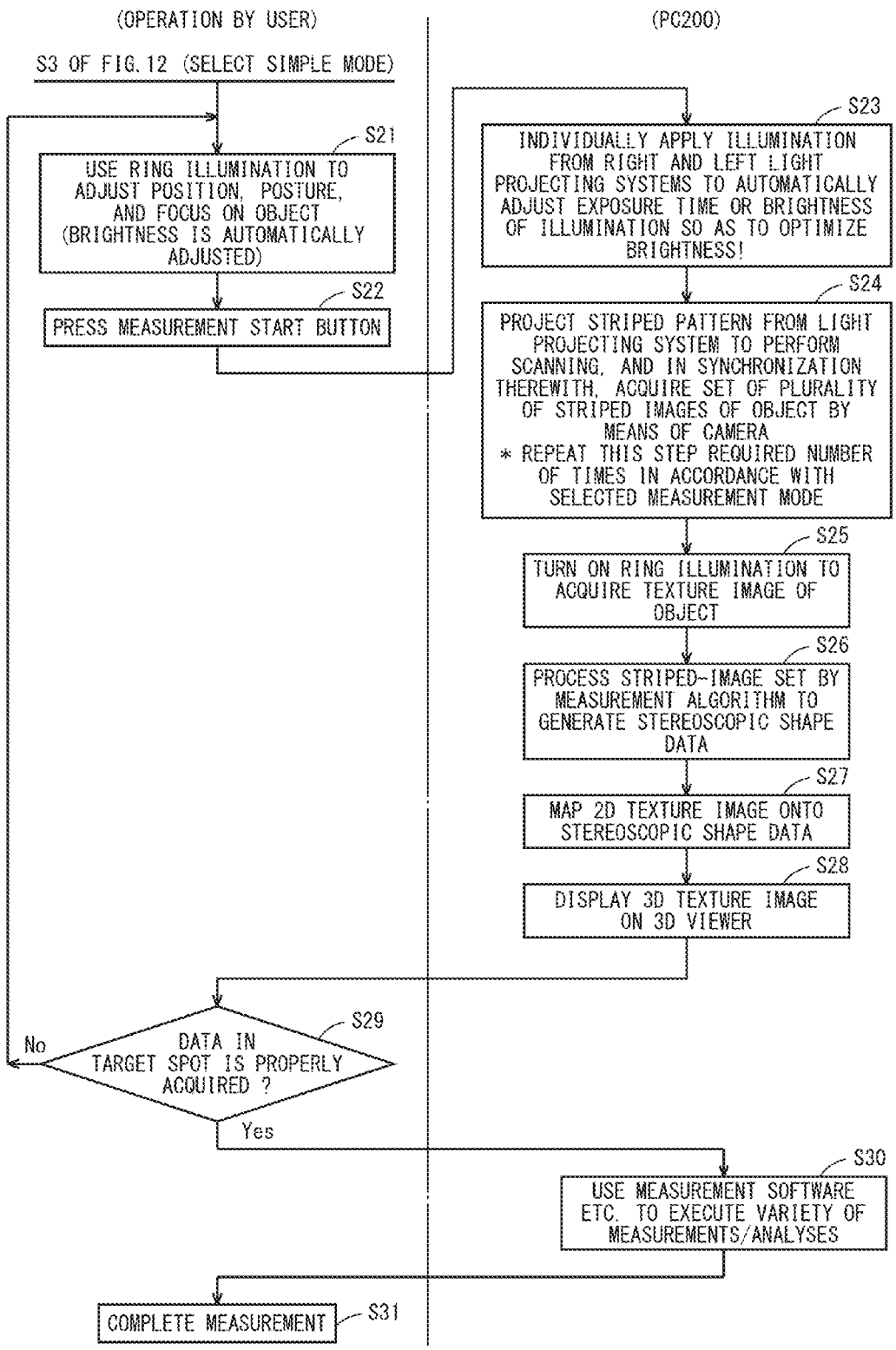
FIG. 15 is a flowchart for explaining operations and manipulations at the time of selecting the simple measurement mode (high-speed measurement mode) in the shape measuring device of the embodiment.
Figure 16:
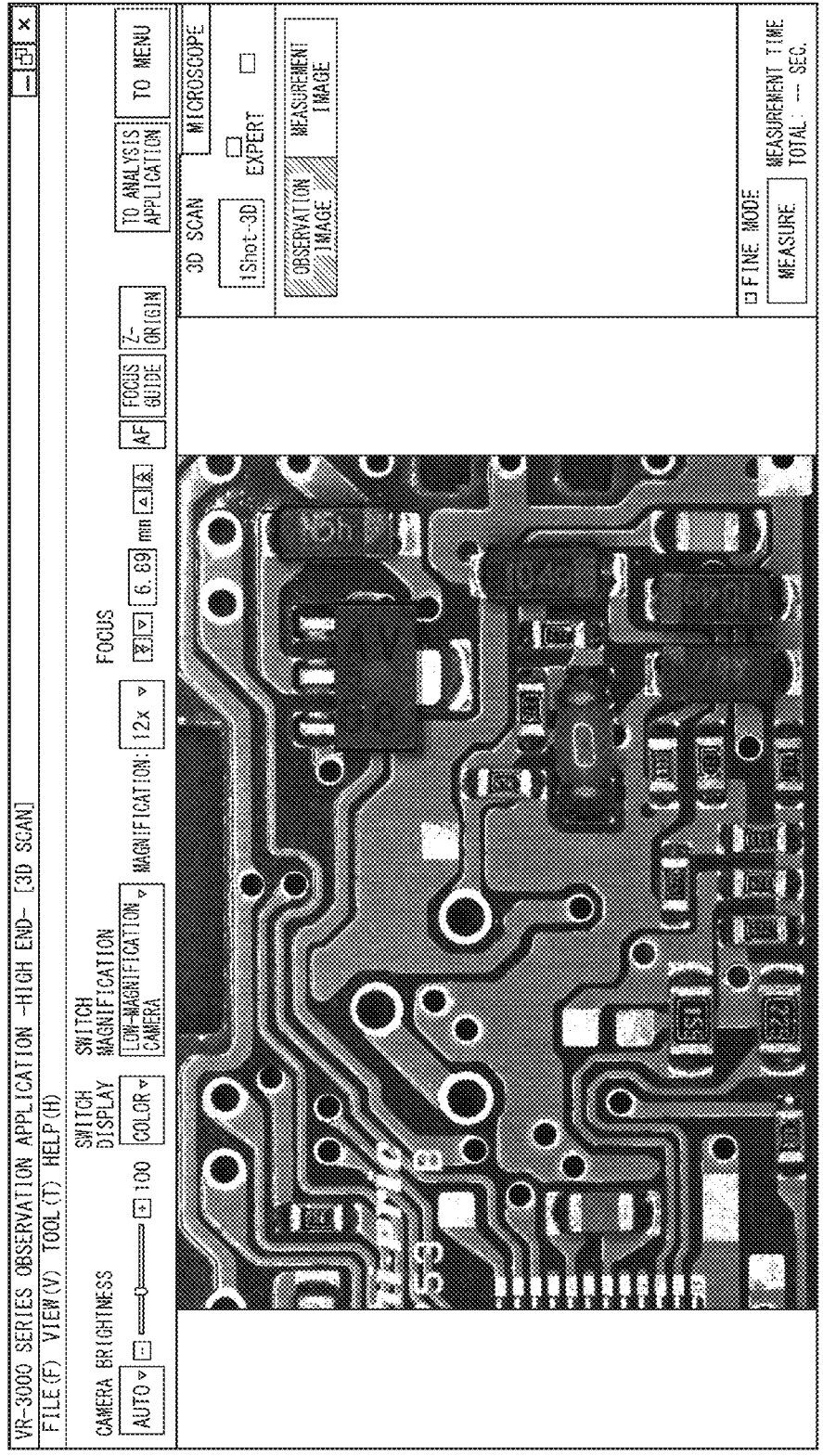
FIG. 16 is a view showing an observation screen (GUI) on which a microscope mode or a measurement mode can be selected.
Figure 17:
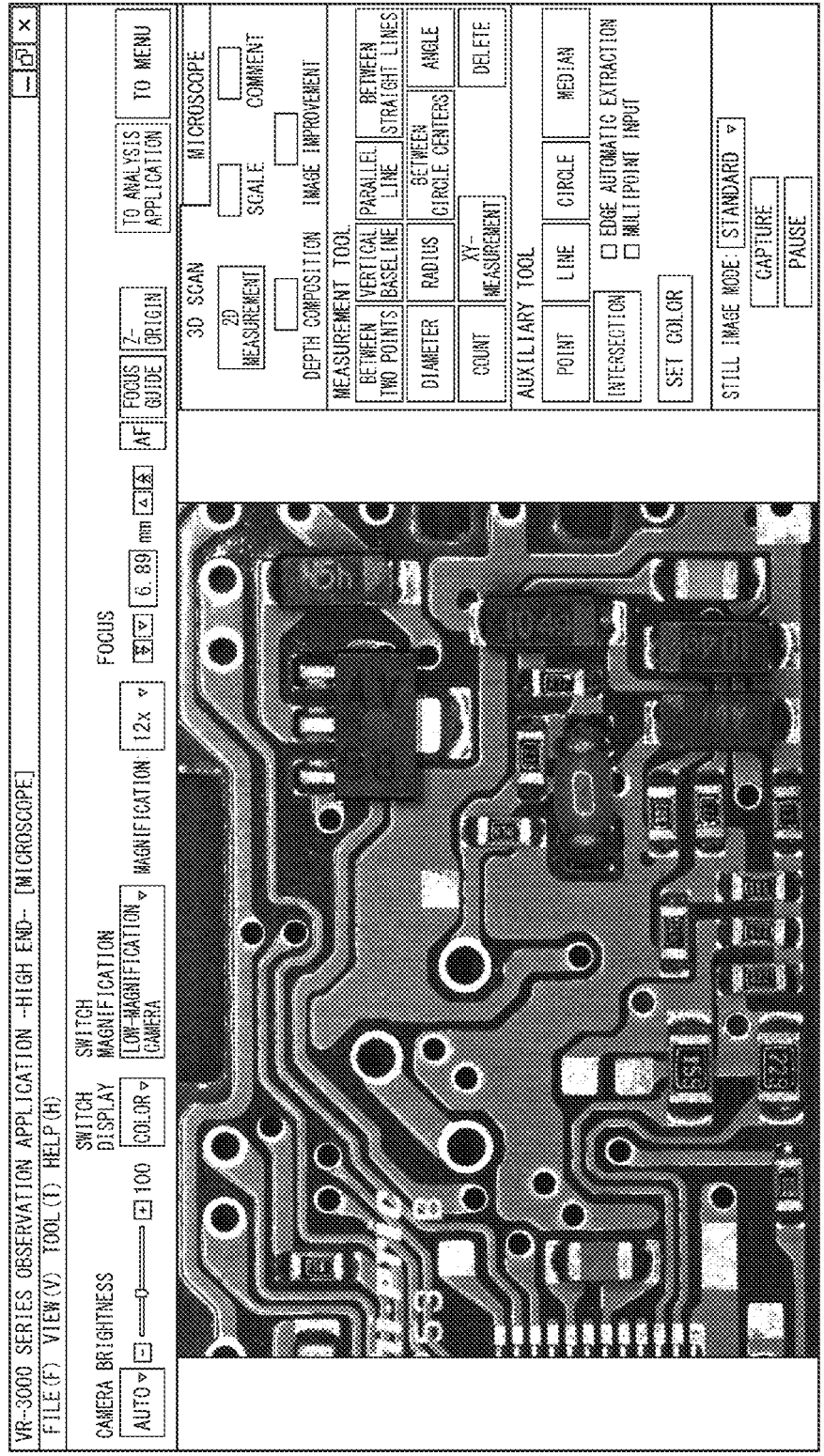
FIG. 17 is a GUI displayed at the time of pressing down a microscope button to select the microscope mode.
Figure 18:
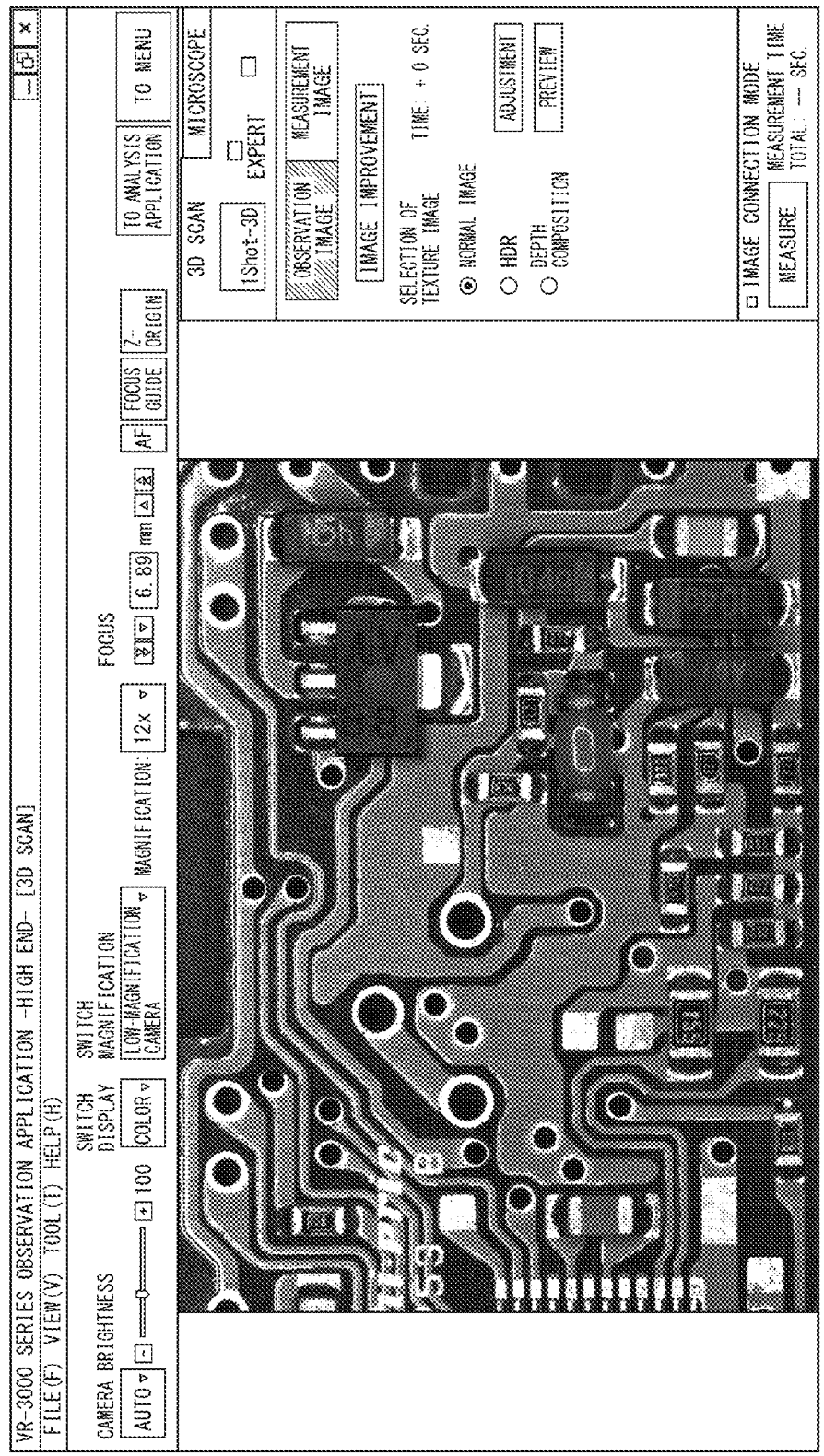
FIG. 18 is a GUI displayed at the time of pressing down a 3D scan button to select the shape measurement mode.

Operations and Manipulations of Shape Measuring Device 500 (FIGS. 12 to 23):

Although operations and manipulations of the shape measuring device 500 will be described with reference to FIGS. 12 to 23, the operations of the shape measuring device 500 are performed by a mode selected by the user out of a plurality of operation modes. Exemplarily describing the operation modes, in the shape measuring device 500, a microscope mode or a shape measurement mode can be selected by the user. FIG. 16 shows a GUI corresponding thereto. The microscope mode can be selected by pressing a "MICROSCOPE" button seen in the upper right portion of the GUI shown in FIG. 16. The shape measurement mode can be selected by pressing a "3D SCAN" button at the left of the "MICROSCOPE" button.

When the "microscope mode" is selected, the shape measuring device 500 operates as a microscope. At this time, the display of the display section 400 is switched to the GUI of the FIG. 17, where brightness adjustment, focus adjustment, magnification switching, dimensional measurement, and the like can be performed in a manner similar to a normal microscope. On the other hand, when the "shape measurement mode" is selected, the shape measuring device 500 performs a three-dimensional shape measurement on the object S to generate three-dimensional shape data while acquiring a two-dimensional texture image. The two-dimensional texture image is combined with the three-dimensional shape data to generate a three-dimensional texture image, and the generated three-dimensional texture image is displayed.

The shape measuring device 500 further has a simple measurement mode and an application measurement mode, and the user can select the simple measurement mode or the application measurement mode. A "1 Shot-3D" button and an "EXPERT" button are arranged side by side in the upper right portion of the GUI shown in FIG. 16, and the simple measurement mode (high-speed measurement mode) can be selected by pressing the "1 Shot-3D" button. Accordingly, the shape measurement can be performed without any awareness of adjusting parameters related to the shape measurement, and a three-dimensional texture image can be displayed (FIG. 15).

In the "simple measurement mode", a brightness target value of the 2D texture image is preferably adjustable by the user. Here, the brightness target value refers to a target value for setting how the brightness of the 2D texture image is converged at the time of adjusting the brightness by feedback control. The brightness of the 2D texture image depends on preference of the user in many cases, and hence in the "simple measurement mode", it is preferable that the user adjusts the brightness target value even when a variety of parameters are automatically adjusted. In the simple measurement mode, when the user sets the target value and presses a "MEASUREMENT" button in the lower right of the GUI of FIG. 18, a texture image with appropriate brightness and a shape measurement result acquired with the appropriate brightness are displayed, and a realistic 3D texture image is acquired.

Figure 12:
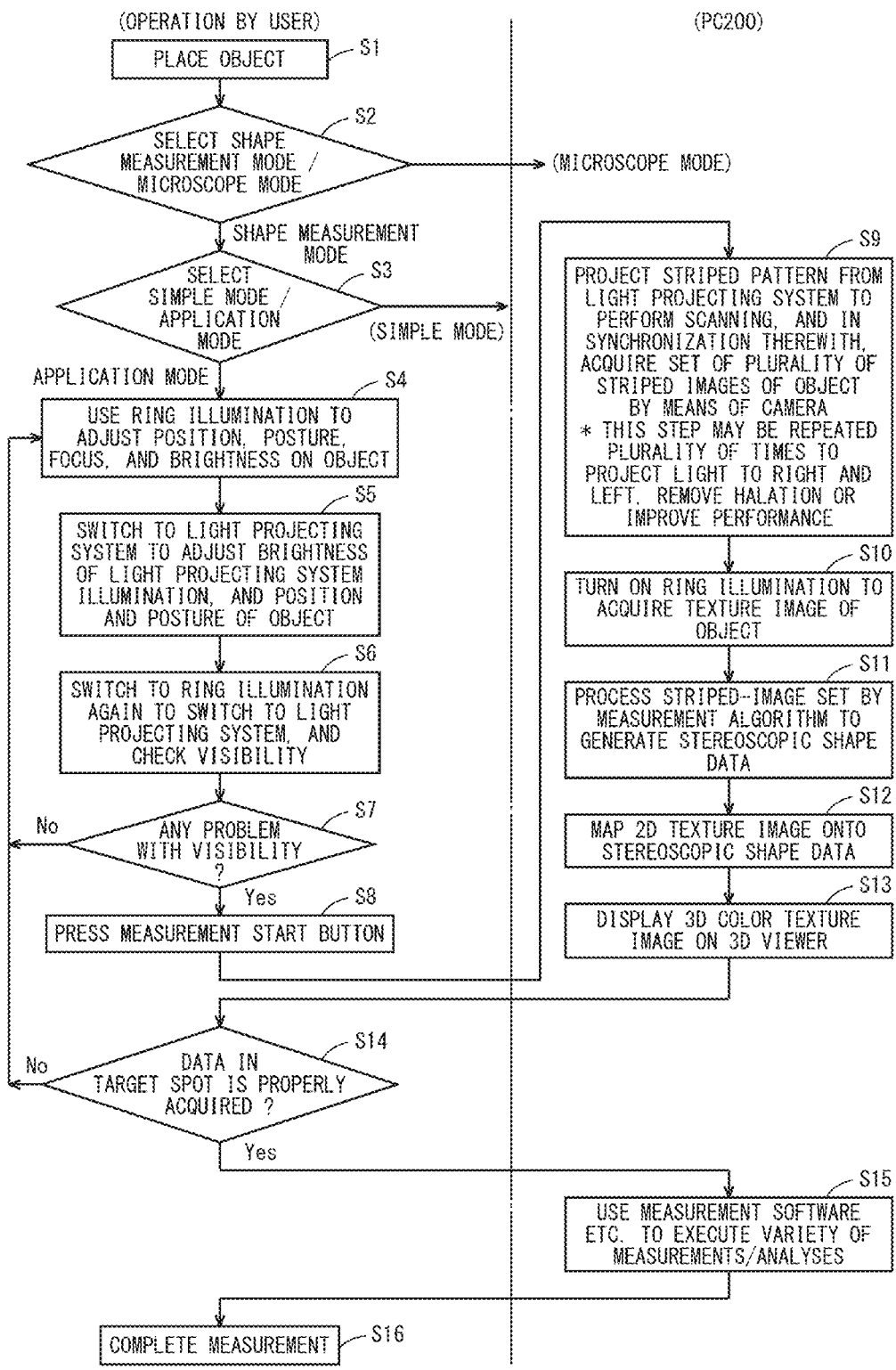
FIG. 12 is a flowchart for explaining operations and manipulations at the time of selecting an application measurement mode in a shape measuring device of an embodiment.
Figure 13:
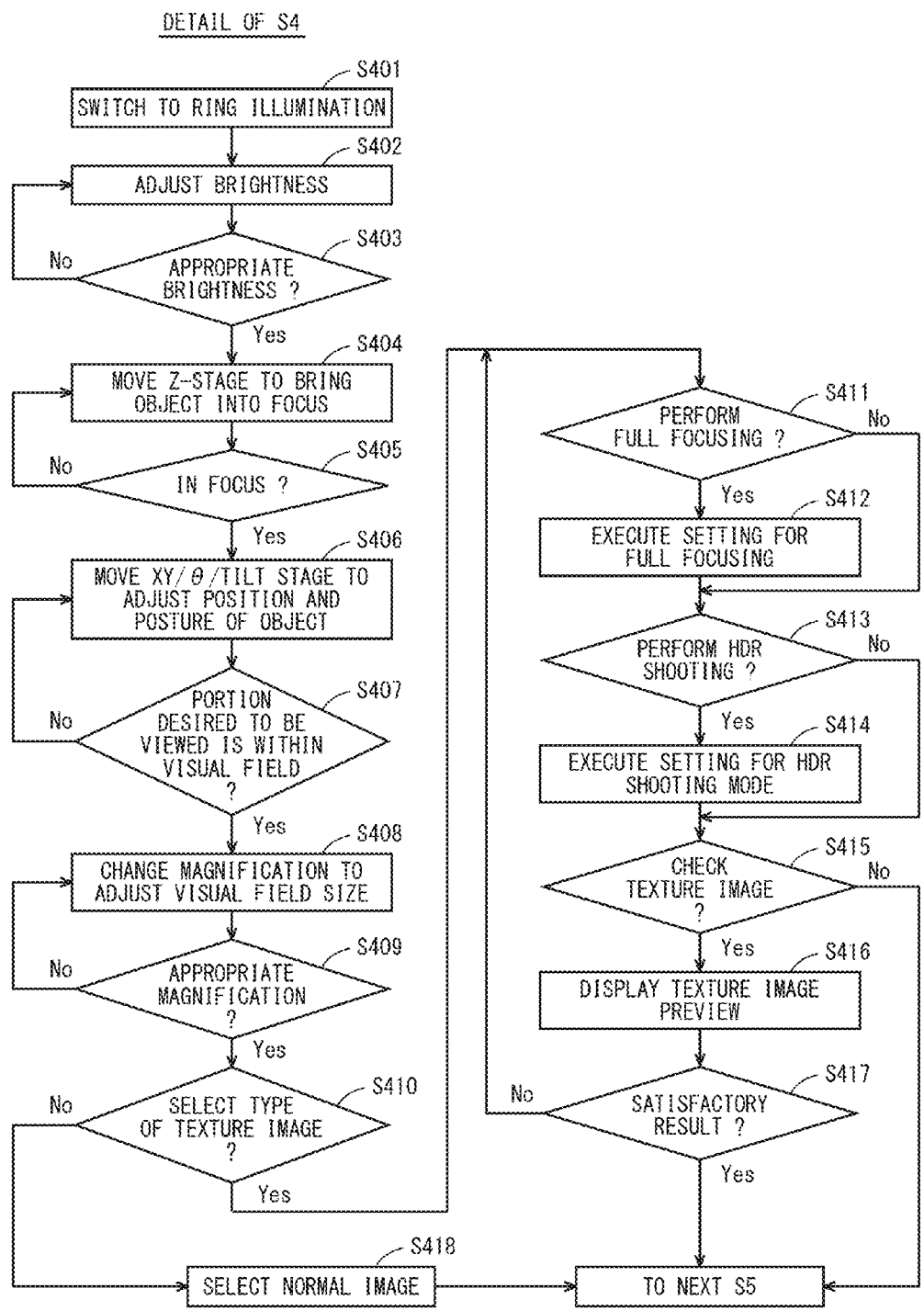
FIG. 13 is a flowchart for explaining a variety of adjustments performed by a user in acquiring a two-dimensional texture image of the object in the application measurement mode.
Figure 14:
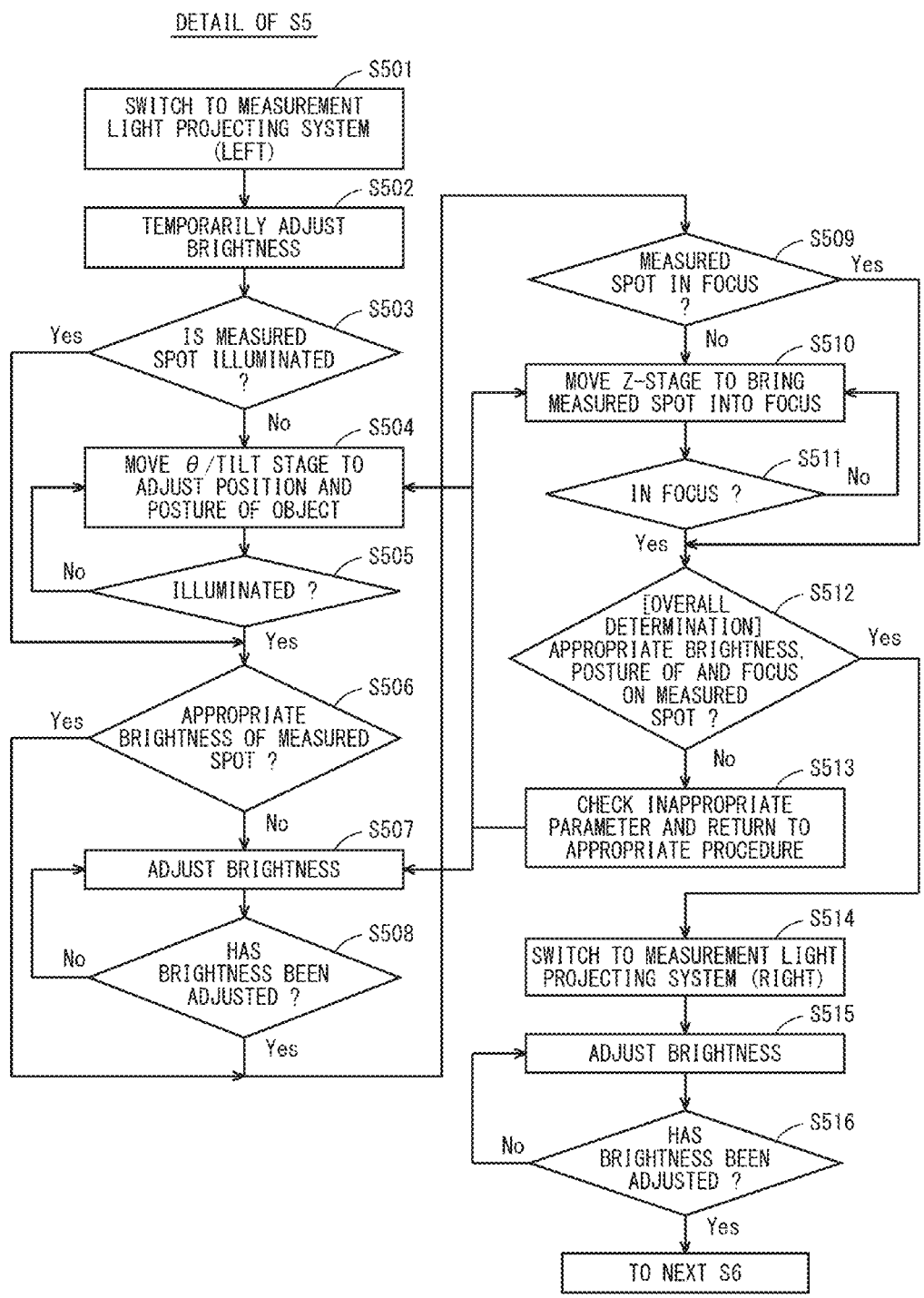
FIG. 14 is a flowchart for explaining a variety of adjustments performed by the user in acquiring a three-dimensional texture image for measurement in the application measurement mode.
Figure 19:
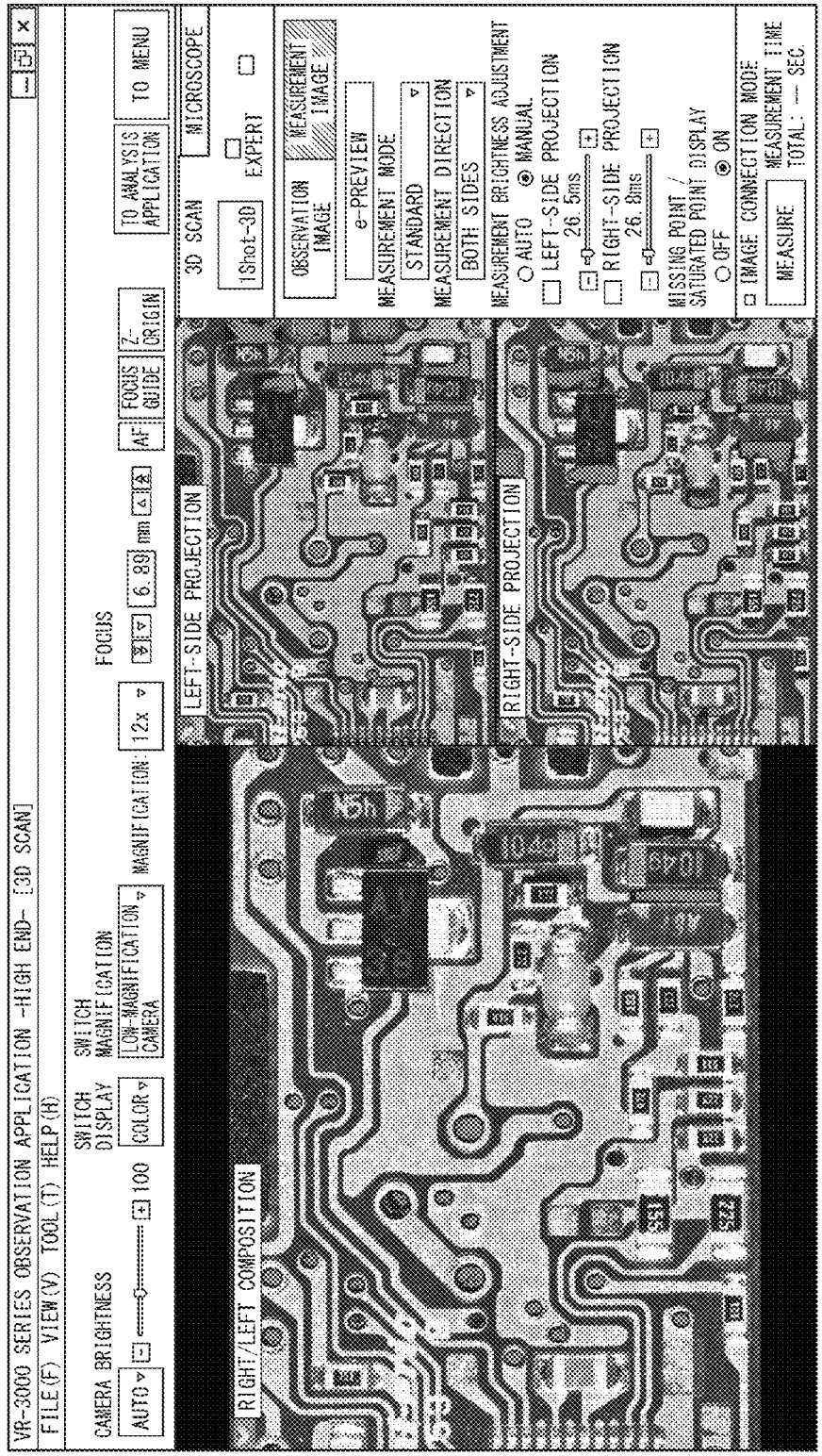
FIG. 19 is a GUI for setting measurement conditions displayed at the time of selecting the application measurement mode.

On the other hand, when the user presses the "EXPERT" button shown in the GUI of FIG. 16, the screen is switched to a measurement condition setting screen of GUI shown in FIG. 19, and the user can take part in the adjustment and setting of parameters related to the shape measurement by using the GUI shown in FIG. 19 (FIGS. 12 to 14).

Figure 20:
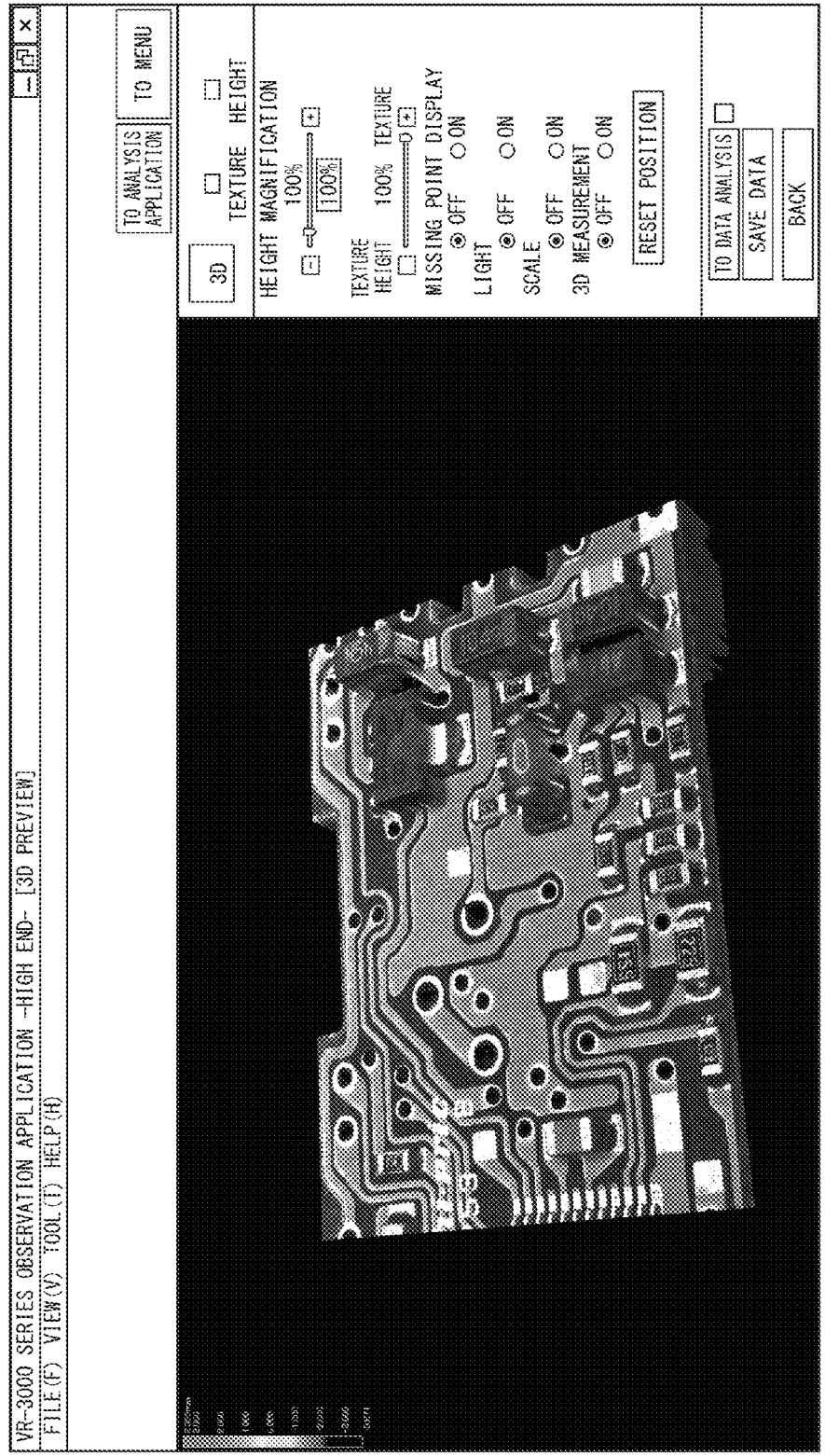
FIG. 20 is a GUI for confirming a result of display of a 3D texture image.

In either the simple measurement mode or the application measurement mode, the result can be displayed in the display section 400 (FIG. 20). That is, as can be seen from a result confirmation screen of FIG. 20, a realistic 3D texture image is displayed on a 3D viewer. The user can confirm a stereoscopic shape of the object S by dragging the mouse.

When a "TO ANALYSIS APPLICATION" button in the upper right of the result confirmation screen (FIG. 20) displayed in the display section 400 (monitor: FIG. 1) is pressed, the screen is switched to a GUI (function guide screen) shown in FIG. 21 while an analysis application is activated, and a part of functions selectable in this data analysis application is displayed.

Figure 21:
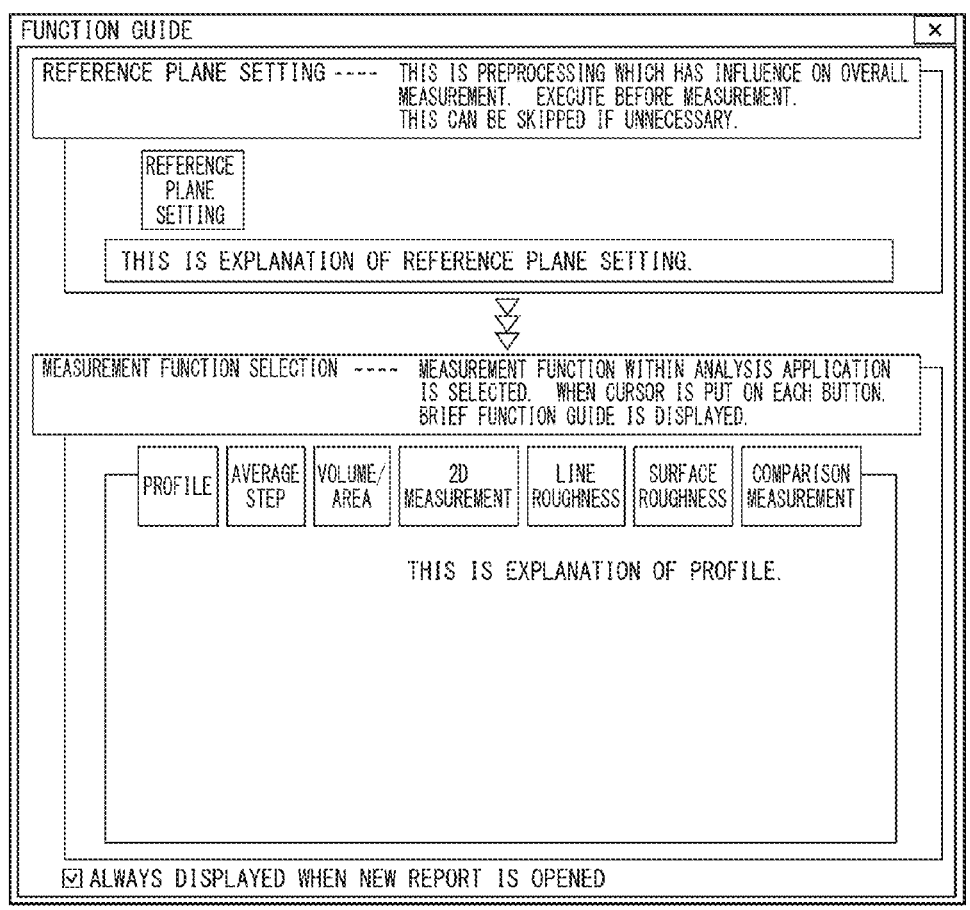
FIG. 21 is a GUI for a function guide displaying a part of functions of analysis application installed in a PC.
Figure 22:
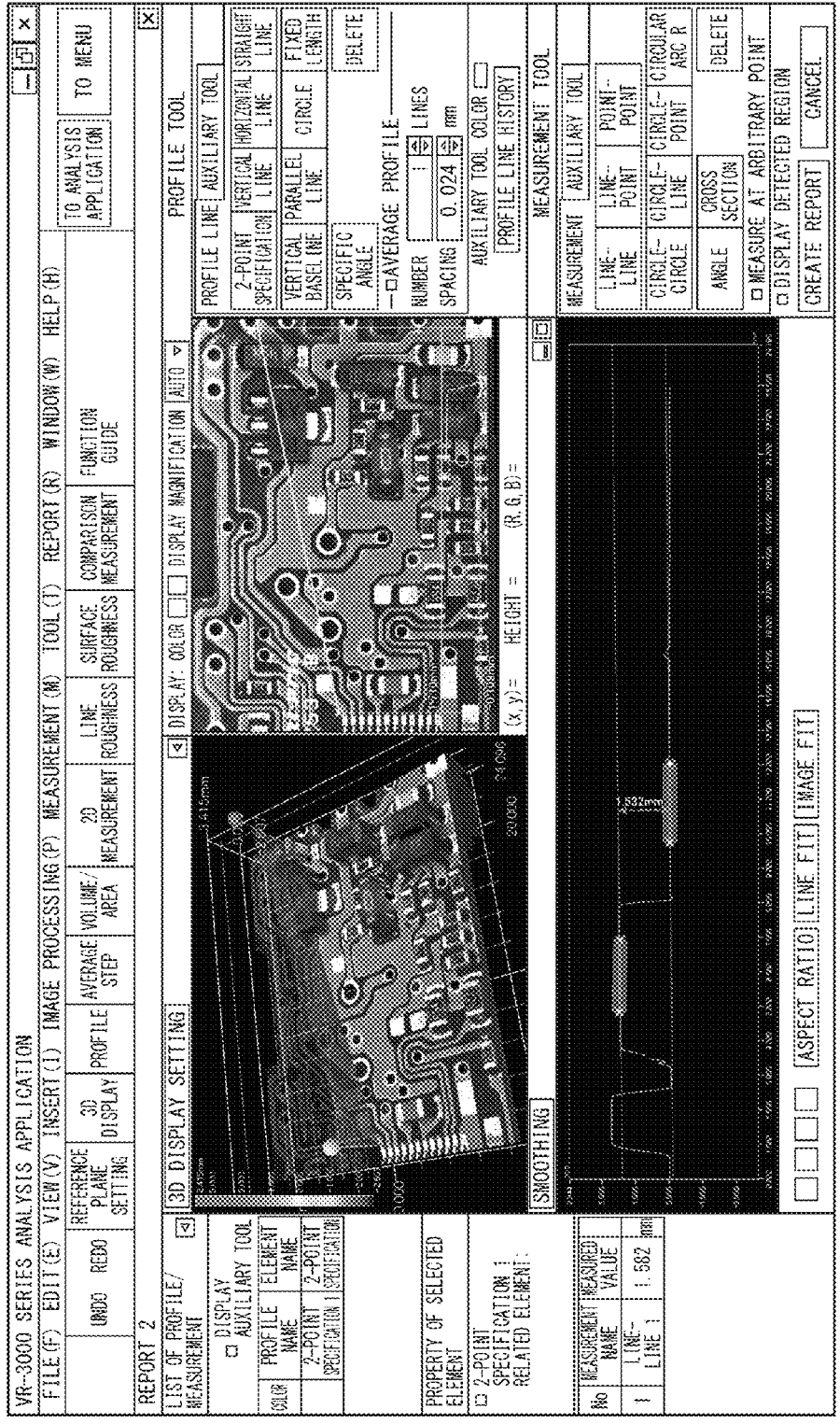
FIG. 22 is a GUI for profile measurement.
Figure 23:
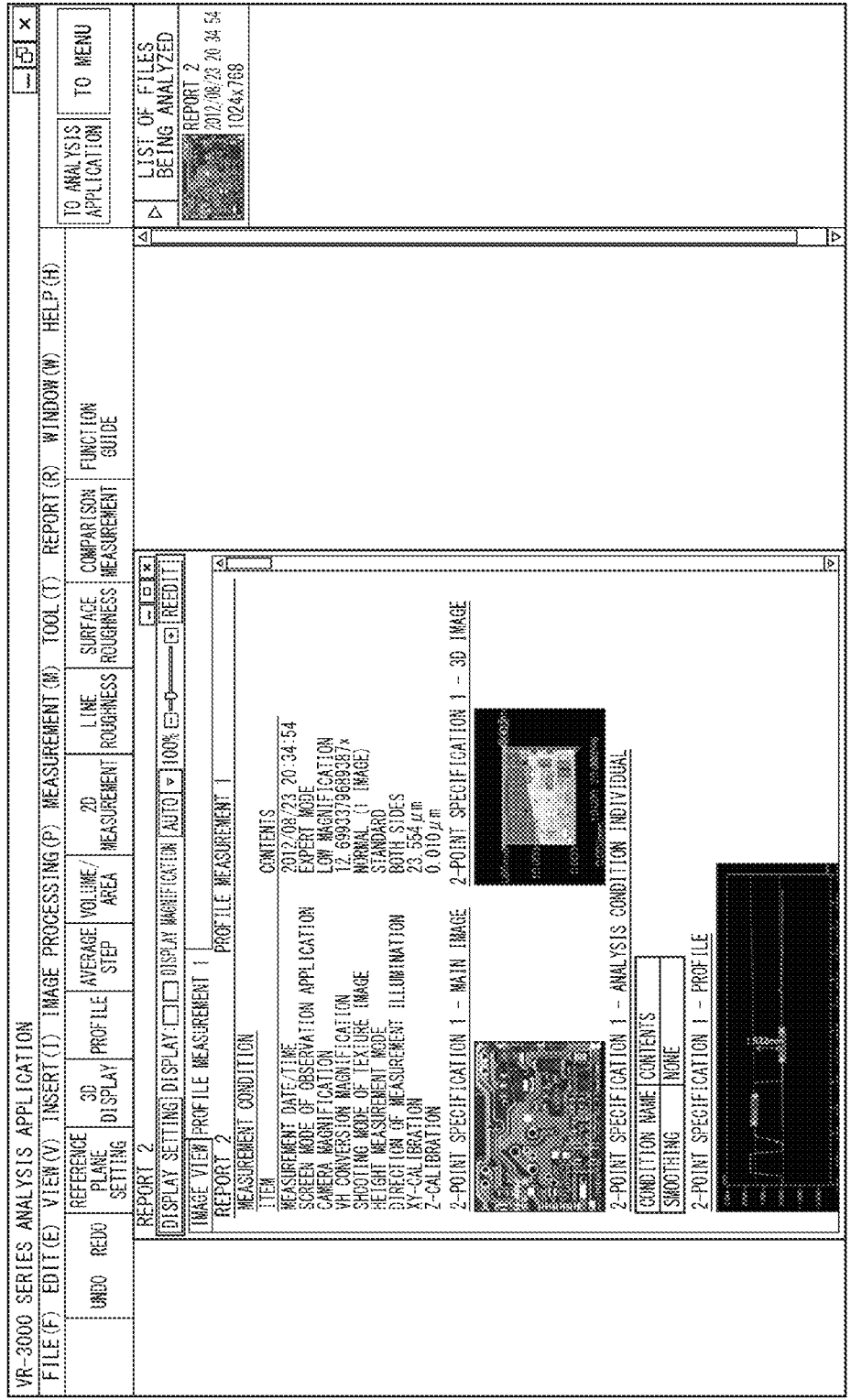
FIG. 23 is a GUI for report display.

For example, when a profile button displayed in the GUI of FIG. 21 is pressed, the screen is switched to a profile display on the screen of FIG. 22, and by pressing a report creation button in the lower right of the GUI of FIG. 22, a report shown in FIG. 23 can be displayed.

FIG. 12 is a flowchart for explaining basic operations of the shape measuring device 500 and manipulations of the user which are required for performing the operations. When the operations and manipulations of the shape measuring device 500 are described in accordance with the flowchart of FIG. 12, first, the user places the measuring object S on the stage 140, and selects the shape measurement mode or the microscope mode in next step S2. When the microscope mode is selected, the measuring object S can be observed in the same manner as with the conventionally known microscope. At this time, ring illumination using the illumination light output section 130 is employed.

When assuming that the user selects the shape measurement mode, the process goes to next step S3, and the user selects the simple measurement mode or the application measurement mode. When the user selects the application measurement mode, the process goes to step S4 of FIG. 12. On the other hand, when the simple measurement mode is selected, operations in the simple measurement mode, which will be described later with reference to FIG. 15, are performed.

Application Measurement Mode (FIGS. 12 to 14):

In step S4, the user adjusts a focus, a visual field position, brightness, camera exposure time, or the like while viewing the display section (monitor) 400 showing the measuring object S placed on the stage 140. As illumination used in this observation, uniform illumination from the light projecting section 110 may be used, but the ring illumination using the illumination light output section 130 is generally used.

In next step S5, the illumination is switched from the ring illumination 130 to the light projecting section 110, to adjust the brightness of the light projecting section 110 or the camera exposure time. Since the illumination by the light projecting section 110 is obliquely applied to the measuring object S, a shade is formed due to the stereoscopic shape such as irregularities of the surface property of the object. Further, the visibility may be more favorable by tilting the stage 140 depending on the surface state of the measuring object S. Moreover, the position and posture of the measuring object S are readjusted as necessary.

When the object S is moved in the foregoing adjustment of the light projecting section 110, the visibility of the object S by the ring illumination using the illumination light output section 130 is confirmed again, and the brightness of the ring illumination and the camera exposure time are readjusted (step S6). Naturally, this operation can be omitted if unnecessary. When the posture and the position of and the focus on the object S and illumination conditions for measurement using the light projecting section 110 are determined (step S7), the user presses down a measurement start button (step S8). Based on this command, an image of the object S is acquired by the camera 121 while the pattern generating section 112 of the light projecting section 110 and the camera 121 are tune-controlled to project a plurality of patterns. The image is then subjected to an appropriate process in the control board 150, and thereafter transmitted to the control PC 200. That is, the shape measuring device 500 acquires a plurality of striped images by the camera 121 while performing scanning with a plurality of striped patterns using the light projecting section 110 (step S9). After being subjected to the appropriate process on the control board 150, the image is transmitted to the control PC 200.

In next step S10, using the ring illumination 130 arranged on the same axis as the optical axis of the camera 121 or all-white uniform illumination of the light projecting section 110, an image (texture image) of the surface state of the object S is acquired by the camera 121, and the acquired image is transmitted to the control PC 200.

The control PC 200 appropriately performs image processing and an analysis on the received image data with the foregoing measurement algorithm, to generate stereoscopic shape data (step S11), and displays in the display section (monitor) 400 a 3D texture image generated by mapping the two-dimensional texture image onto the foregoing stereoscopic shape data by means of a dedicated program.

When the application measurement mode is described with reference to FIG. 12, the user performs adjustment (first adjustment) as to shooting, such as the position and the posture of the measuring object S, the focus on the light receiving section 120, the brightness of the illumination or the camera exposure time, while viewing an image which is displayed in the display section 400 by irradiating the measuring object S with light from the ring-shaped illumination light output section 130 (step S4). Details of this first adjustment will be specifically described later with reference to FIG. 13.

Upon completion of the first adjustment, a second adjustment for the measurement is then performed (step S5). In this second adjustment, the light projecting section 110 which irradiates the object S with light obliquely from above is used. That is, the illumination is switched from the ring-shaped illumination light output section 130 used in the first adjustment to the light projecting section 110, and the second adjustment is performed. In this second adjustment (step S5), the object S is irradiated with light from the light projecting section 110, and the position and the posture of the object S, the brightness of the illumination, the camera exposure time, or the like is adjusted while the image displayed in the display section 400 is viewed. Details of this second adjustment will be specifically described later with reference to FIG. 14.

Upon completion of the second adjustment, in next step S6, as a precaution, the illumination is switched to the ring-shaped illumination light output section 130 to confirm whether a problem has not occurred with the visibility of the image. If there is a problem, the process returns from step S7 to step S4, to perform the first and second readjustments. When the image display becomes satisfactory, the process goes to step S8, where the "measurement start button" prepared in the GUI of the display section 400 is pressed.

Subsequently, with reference to FIG. 12, the PC 200 accepts the manipulation of the measurement start button (step S8), and starts measurement using the light projecting section 110 (step S9). Measurement images of the measuring object S captured by the camera 121 are acquired in synchronization with illumination of the third illumination pattern and the fourth illumination pattern from the light projecting section 110. In this capturing of the measurement images, a variety of modes may be previously prepared and the capturing may be performed in accordance with the mode selected by the user. Specifically, for example, in the case of the object S having a smooth surface property in which heights of irregularities are relatively small, a mode may be prepared in which measurement is performed by illumination of only one of the first light projecting section 110A and the second light projecting section 110B. In the case of the object S having mixed surface properties of high reflectivity and low reflectivity, a halation removal mode may be prepared in which images, shot a plurality of times while a shutter speed is changed, are synthesized. Naturally, a mode for repeatedly performing this measurement process may be prepared.

In next step S10, the illumination is switched from the light projecting section 110 to the ring-shaped illumination light output section 130, to acquire a 2D texture image of the object S. As described above, the illumination from the light projecting section 110 may be added to the illumination from the ring-shaped illumination light output section 130.

In next step S11, a set of the measurement image data acquired in step S9 is processed in accordance with the foregoing measurement algorithm, to obtain a height with respect to each pixel and generate stereoscopic shape data. That is, the CPU 210 processes the set of the acquired striped pattern images with the predetermined measurement algorithm, to generate three-dimensional shape data of the measuring object S, and this three-dimensional shape data is stored into the working memory 230.

Then, a 2D (two-dimensional) texture image is mapped onto this three-dimensional shape data in next step S12, to generate a 3D (three-dimensional) color image, and this 3D color image is displayed on the 3D viewer of the display section (monitor) 400 (S13).

The user will probably be surprised that the display of the display section (monitor) 400 is changed from the color observation image whose visibility has been adjusted in steps S4 to S7 to the realistic color 3D texture image in just a short period of time, almost instantly, only by the manipulation of pressing the measurement start button (S8).

Thereafter, the user confirms as necessary whether data of a target spot of the object S has been properly acquired by means of the 3D texture image in the display section 400, and when the result is NO, the process may be restarted from the beginning. When the data desired by the user has been acquired, a variety of measurements and analyses on a cross-section, an edge angle, and surface roughness, and the like of the measuring object S are performed by use of the arbitrary program (e.g., measurement software) installed in the PC 200 (S15).

Details of First Adjustment (FIG. 13):

FIG. 13 is a flowchart for explaining the details of step S4 (FIG. 12: first adjustment). With reference to FIG. 13, the user first turns ON the ring-shaped illumination light output section 130 (S401), and adjusts the brightness of the illumination light and the exposure time for the camera 121 while viewing an image shown in the display section 400 (step S402). Next, when the brightness of the image displayed in the display section 400 in real time becomes appropriate, the process goes from step S403 to step S404, and the Z-stage 142 is operated to perform focusing. Upon completion of the focusing (S405), the process goes to step S406, where the position and the posture of the measuring object S are adjusted. Specifically, this adjustment can be performed by operating the XY-stage 141, the θ-stage 143, and the tilt stage.

When it is confirmed from the image in the display section 400 that the portion of the measuring object S desired to be observed is within the visual field, the process goes from step S407 to step S408, and the magnification of the camera 121 is changed as necessary. When the magnification is appropriate, the process goes from step S409 to step S410, and the type of texture image to be displayed in the display section 400 is selected. Here, examples of the type of the texture image may include a normal image, a full focusing image, and an HDR image. By selecting the type of the texture image, it is determined whether or not to perform full focusing and execute a high dynamic range (HDR) mode in subsequent steps. Note that, the adjustment of the visual field size in step S408 may be performed by digital zooming. Then, in next step S411, the full focusing is selected in which a plurality of images are acquired while a relative distance between the object S and the light receiving section 120 in the optical-axis direction is changed, and only portions in focus are synthesized to generate a two-dimensional texture image. Moreover, in step S413, images, which are shot a plurality of times while the brightness of the illumination light output section 130 or the camera exposure time is changed, are synthesized and a previously prepared texture acquirement mode is selected, e.g., the high dynamic range (HDR) mode for generating a texture image with an expanded dynamic range is selected, and a setting for the synthesized image is performed (S414). Here, the high dynamic range (HDR) mode is used for the purpose of improving the appearance of the 2D texture image at the time of acquiring the 2D texture image.

Next, in step S415, whether or not to confirm the texture image is selected, and when the result is NO, the process goes to the second adjustment (FIG. 12: S3). As to confirmation of the adjustment result, the 2D texture image after the adjustment is displayed in the display section 400 for preview (S416), and when this preview texture image is satisfactory, the process goes to the second adjustment (FIG. 12: S3). When the displayed preview texture image is not satisfactory, the process returns to step S411 and resetting is performed. Since the above two-dimensional (2D) texture image that is a result of the adjustment by the user can be previewed by the user, the appearance of the 2D texture image can be appropriately adjusted.

Details of Second Adjustment (FIG. 14):

FIG. 14 is a flowchart for explaining the details of step S5 (FIG. 12: second adjustment). With reference to FIG. 14, an arbitrary light projecting section out of the pair of the light projecting sections 110A and 110B, e.g., the first light projecting section 110A is turned ON (S501), and the brightness of the measurement light emitted from this first light projecting section 110A is temporarily adjusted (S502). An image of the measuring object S displayed in the display section (monitor) 400 in real time is viewed, to confirm whether the spot desired to be measured is well illuminated (S503), and when the result is NO, the position and the posture of the measuring object S are adjusted (step S504). The adjustments of the position and the posture of the measuring object S can be performed by operating the θ-stage 143 and the tilt stage. When it is confirmed from the real-time displayed image in the display section 400 that the spot of the object S desired to be measured is appropriately illuminated by the above adjustment (S505), the process goes to step S506, where it is confirmed whether or not the brightness of the spot desired to be measured is appropriate by viewing the image displayed in the display section 400 in real time (S506), and readjustment of the brightness is performed as necessary (S507). When it is confirmed from the displayed image in the display section 400 that the spot desired to be measured is appropriately illuminated (S508), the process goes to step S509, where it is confirmed whether or not the spot desired to be measured is appropriately in focus.

If focusing is required, the process goes to step S510, where the Z-stage 142 is operated to perform focusing. When this focusing is confirmed from the real-time displayed image in the display section 400 (S511), the process goes to step S512, where it is confirmed from the displayed image in the display section 400 whether or not the brightness of the measured spot, the posture, and focusing are all appropriate, and when there is an inappropriate parameter, this is readjusted (S513).

Upon completion of the adjustment of the first light projecting section 110A, the process goes to step S514, where the illumination is switched from the first light projecting section 110A to the second light projecting section 110B to adjust the brightness of the measurement light emitted from the second light projecting section 110B. When it is determined that this brightness is appropriate from the real-time displayed image in the display section 400, the second adjustment is completed, and the process goes to next step S6 (FIG. 12).

In the application measurement mode, a detailed measurement mode in accordance with the stereoscopic shape measurement may be selectable. The measurement modes may include, for example, a standard mode for performing a normal stereoscopic shape measurement, a halation removal mode for removing halation of an image based on a plurality of images captured while the camera exposure time is changed, and performing the stereoscopic shape measurement, a fine mode for measuring a translucent body such as a resin. A variety of measurement modes corresponding to types of measuring objects to be measured are previously prepared, to thereby allow the user to select a measurement mode corresponding to the measuring object.

Further, in the application measurement mode, the user can also select the irradiation direction of the measurement light. In the case of two light projecting sections being provided on the right side and the left side as in this embodiment, any of both-side light projection, right-side light projection, and left-side light projection is selected. When measurement is performed by the both-side light projection, a shade portion is small as compared with the case of the one-side light projection. However, respective measurements by the right-side light projection and the left-side light projection are performed independently from each other, and the both-side light projection takes more time as compared with the one-side light projection. Accordingly, when a spot desired to be measured can be sufficiently measured by means of the one-side light projection, it is preferable that the user selects the measurement mode by the one-side light projection.

Moreover, in the application measurement mode, measurement accuracy may be arbitrarily selected by the user. For example, measurement modes in which the user can change the accuracy in stages, such as a low accuracy measurement mode, a standard measurement mode, and a high accuracy measurement mode are prepared. For example, in the low accuracy measurement mode, measurement can be performed only by the space coding method. In the standard measurement mode, measurement can be performed by combination of the space coding method having a low bit count and measurement by a rough stripe projection pattern. In the high accuracy measurement mode, measurement can be performed by combination of the space coding method having a high bit count and measurement by a fine stripe projection pattern. The user selects from these measurement modes based on the desired measurement accuracy and the time required for the measurement.

As described above, in the application measurement mode, it is possible to adjust a variety of parameters in accordance with the detailed stereoscopic shape measurement, and it is also possible to adjust the brightness of, and set the type of the texture image mapped onto the stereoscopic shape. The user can perform a setting for the stereoscopic shape measurement while confirming a synthesized image of images captured from the respective irradiation directions, which is shown on the left side of FIG. 19, and images by the one-side light projection, which are displayed vertically aligned on the right side of the figure. In these images, a shaded region that cannot be measured and an excessively bright saturated region are highlighted as unmeasurable regions, and displayed as distinguished from the other regions. While confirming a change in unmeasurable region, the user can adjust the irradiation direction, the brightness, the measurement mode, and the like, and can thus adjust each parameter so as to make a desired region reliably measurable.

At the time of performing the setting for the texture image, the displayed image is switched to an observed image illuminated by the illumination light output section 130. While confirming the state of the texture image that changes in real time, the user can set the brightness and the type thereof. The image displayed in the application measurement mode changes in association with a parameter selection made by the user. For example, in the case of setting the brightness of the texture image, the displayed image is switched to the observed image illuminated by the illumination light output section 130. Further, when the both-side light projection is selected in terms of the irradiation direction, the three-split image display shown in FIG. 19 is obtained, and when the one-side light projection is selected, one image captured in the selected irradiation direction is enlarged and displayed (not shown). Either image is preferably a moving image, and adjustments of the parameters are reflected to the displayed image in real time.

Simple Measurement Mode (High-Speed Measurement Mode: FIG. 15):

When the simple measurement mode button displayed in the display section 400 is pressed in step S2 of FIG. 12, the process goes to step S21 of FIG. 15. In step S21, the position and the posture of and the focus on the object S are adjusted while the illumination is provided by the ring-shaped illumination light output section 130, and an image displayed in the display section 400 is viewed. The brightness of the image is automatically adjusted in accordance with a target value previously set by the user. Upon completion of this adjustment in step S21, the user can execute the simple measurement mode by pressing the measurement start button displayed in the display section 400 (S22).

Upon acceptance of the manipulation of the measurement start button, the PC 200 individually turns ON the right and left light projecting sections 110A and 110B to automatically adjust the exposure time or the brightness of the illumination so that the image shown in the display section 400 has the optimum brightness (S23). In next step S24, scanning is performed with a plurality of striped patterns by using the light projecting section 110, and in synchronization therewith, a plurality of striped images are acquired by the camera 121.

Further, in next step S25, using the ring illumination 130 arranged on the same axis as the optical axis of the camera 121 or the all-white uniform illumination of the light projecting section 110, an image (2D texture image) of the surface state of the object S is acquired by the camera 121, and the acquired image is transmitted to the control PC 200.

The control PC 200 appropriately performs image processing and an analysis on the received image data with the foregoing measurement algorithm, to generate stereoscopic shape data (step S26).

The control PC 200 displays, on the 3D viewer of the display section (monitor) 400, a 3D texture image generated by mapping the two-dimensional texture image onto the foregoing stereoscopic shape data by means of a dedicated program (steps S27, S28).

Thereafter, the user confirms, as necessary, from the 3D texture image in the display section 400 whether data of a target spot of the object S has been properly acquired, and when the result is NO, the process may be restarted from the beginning (steps S29, S21). When the data desired by the user has been acquired, a variety of measurements and analyses on a cross-section, an edge angle, and surface roughness of the measuring object S, and the like are performed by use of the arbitrary program (e.g., measurement software) installed in the PC 200 (S30). Further, a report is displayed as necessary.

With this simple measurement mode provided in the shape measuring device 500, only by pressing the measurement start button, the user can confirm a 3D texture image displayed in the display section 400 immediately thereafter. When this 3D texture image is satisfactory, an analysis or the like of the object S can be performed by use of a variety of applications (e.g., analysis application) installed in the PC 200, and a report thereof can be outputted.

The example of using the ring-shaped illumination light output section 130 has been described in the foregoing example, but the illumination light output section 130 is not necessarily essential. Since the ring-shaped illumination light output section 130 is merely an illumination element for preventing a shade from being formed in a shot image, another lighting equipment may be employed or equipment that illuminates the object S obliquely from above, like the light projecting section 110, may be employed. Moreover, the coaxial epi-illumination arranged on the same axis as the optical axis of the light receiving section 120 may be employed.

Furthermore, the parameters respectively settable in the simple measurement mode and the application measurement mode and the automatically adjusted parameters are not restricted to the above. For example, in the simple measurement mode, a focal position may be automatically adjusted in addition to the brightness. In this case, since not only the brightness but also the focal position is automatically adjusted, a texture image with a small blur can be mapped onto stereoscopic shape data. For example, a known auto focus technique using a contrast of an image and the like can be employed for the adjustment of the focal position.

Further, the measurement start button for executing measurement by means of the simple measurement mode may be provided not on the display screen of the PC 200 (display section 400), but in a body of the measurement section 100. In this case, when a measurement result is displayed in the display section separately mounted on or connected to the measurement section 100, the measurement result can be simply confirmed without using the PC 200.

It can be said that in the shape measuring device 500 of the embodiment, a three-dimensional shape measurement function using the triangulation principle has been added to the microscope. In this case, the user needs to adjust a large number of parameters as compared with the cases of the conventional microscope or the shape measuring device. That is, it is necessary to adjust parameters for acquiring a texture image suitable for the observation, and adjust parameters suitable for the shape measurement. A stereoscopic shape suitable for the observation, namely, a color 3D texture image, can be acquired by adjusting the above parameters, but the adjustment of the parameters for acquiring a color 3D texture image is troublesome for those who are not familiar therewith.

In order to deal with this problem, the simple measurement mode has been prepared in the shape measuring device 500 of the embodiment. By operating the simple measurement mode, the user can acquire a color 3D texture image with the same feeling of manipulation as pressing an imaging button on the conventional microscope to capture a two-dimensional image without being aware of shape measurement parameters. Naturally, since the simple measurement mode is aimed at alleviating an operation of an operator setting a plurality of parameters, settings for all parameters may be automated. However, the user may perform a setting for a shape measurement parameter such as the irradiation direction, which eventually leads to further time reduction when left to the user.

According to the shape measuring device 500 of the embodiment, the user is only required to perform the same operation as the operation required with the conventional microscope, the digital microscope, and the like, and just by pressing the "measurement start button" displayed in the GUI, three-dimensional shape data can be acquired without a particular operation for the user, and a realistic color 3D texture image can be displayed in the display section 400 almost immediately after the "MEASUREMENT START button" is pressed.

This means that inhibitions on acquirement of three-dimensional shape data have become extremely low to the user not so familiar with the three-dimensional measurement. Accordingly, while the user easily acquires three-dimensional shape data by a simple operation, it is possible to concentrate energy on a variety of measurements and analyses using this three-dimensional shape data.

Although the embodiment of the present invention has been described above, all or most of manipulations required for displaying a realistic color 3D texture image in the display section 400 may be automated. For example, by designing so as to automatically adjust the brightness in the simple measurement mode (high-speed measurement mode), it is possible to display a color 3D texture image in the display section 400 just by a manipulation very simple for the user. However, when only pursuing the simplicity for the user does not immediately lead to reduction in measurement time, for example, as in the second adjustment for the measurement (FIG. 14), the measurement time can eventually be reduced by having the user perform the manipulation, which is more appropriate to be left to the user, and performing adjustment while confirming a result thereof from a still image displayed in the display section 400 in real time.

The shape measuring device 500 of the embodiment is also applicable to observation using the ring illumination 130 arranged on the same axis as the optical axis of the camera 121 (used as the digital microscope), and to two-dimensional measurement.

The present invention is preferably applicable to a shape measuring device, such as a surface shape measuring device, a microscope, or a digital microscope, which measures an outer shape and a surface shape of an object in a noncontact manner.

What is claimed is:

1. A shape measuring device comprising:
   a light receiving section that has an observation center axis extending toward an object;
   a light projecting section that irradiates the object with light obliquely from above;
   a three-dimensional shape data generating unit for processing a measurement image with a predetermined algorithm to generate three-dimensional shape data, the measurement image acquired in the light receiving section while the object is irradiated using the light projecting section;
   a 3D image generating unit for mapping a two-dimensional texture image of the object onto the three-dimensional shape data to generate a three-dimensional texture image, the two-dimensional texture image acquired in the light receiving section;
   a display section for displaying the three-dimensional texture image generated by the 3D image generating unit; and
   a control unit for executing the processes of
      accepting a manipulation of a user to allow illumination by the light projecting section and acquire the measurement image in the light receiving section in synchronization with the illumination of the light projecting section,
      subsequently processing the measurement image with the predetermined algorithm to generate three-dimensional shape data,
      acquiring the two-dimensional texture image of the object in the light receiving section, and
      mapping the two-dimensional texture image onto the three-dimensional shape data to generate the three-dimensional texture image, wherein
   the user can select an application measurement mode capable of manually adjusting a variety of parameters related to capturing of the image of the object in the light receiving section, or a simple measurement mode capable of manually adjusting a smaller number of parameters than in the application measurement mode in terms of adjusting a variety of parameters related to capturing of the image of the object in the light receiving section.

2. The shape measuring device according to claim 1, wherein when the simple measurement mode is selected, the user is capable of respectively adjusting brightness of the measurement image and brightness of the two-dimensional texture image.

3. The shape measuring device according to claim 1, wherein when the application measurement mode is selected, the user is capable of adjusting brightness of illumination of the light projecting section.

4. The shape measuring device according to claim 3, comprising
   at least a pair of the light projecting sections, wherein
   brightness of illumination of the pair of light projecting sections is adjustable for each light projecting section.

5. The shape measuring device according to claim 1, wherein
   when the application measurement mode is selected, the two-dimensional texture image as a result of adjustment by the user is displayed in the display section for preview.

6. The shape measuring device according to claim 1, wherein the light projecting section includes a telecentric optical system with a fixed magnification.

7. The shape measuring device according to claim 1, wherein the light receiving section includes a telecentric optical system with a fixed magnification.

8. The shape measuring device according to claim 1, wherein the light receiving section includes a monochrome imaging element.

9. The shape measuring device according to claim 1, further comprising
   a ring-shaped illumination light output section arranged around an optical axis of the light receiving section.

10. The shape measuring device according to claim 1, further comprising
    a stage on which the object is placed, wherein
    the stage includes an XY-axis stage movable in an X-axis direction and a Y-axis direction, a Z-axis stage movable in a Z-axis direction, and a θ stage rotatable around the Z-axis.

11. A computer program stored on a non-transitory computer readable recording medium for a shape measuring device, the computer program being applied to a shape measuring device including
    a light receiving section that has an observation center axis extending toward an object,
    a light projecting section that irradiates the object with light obliquely from above,
    a three-dimensional shape data generating unit for processing a measurement image with a predetermined algorithm to generate three-dimensional shape data, the measurement image acquired in the light receiving section while the object is irradiated using the light projecting section,
    a 3D image generating unit for mapping a two-dimensional texture image of the object onto the three-dimensional shape data to generate a three-dimensional texture image, the two-dimensional texture image acquired in the light receiving section, and
    a display section for displaying the three-dimensional texture image generated by the 3D image generating unit,
    the three-dimensional shape data generating unit and the 3D image generating unit being configured by a computer, wherein
    the computer program causes the computer to execute the steps of:
        accepting a manipulation of a user to allow illumination by the light projecting section and acquire the measurement image in the light receiving section in synchronization with the illumination of the light projecting section;
        subsequently processing the measurement image with the predetermined algorithm to generate three-dimensional shape data;
        acquiring the two-dimensional texture image of the object in the light receiving section;
        mapping the two-dimensional texture image onto the three-dimensional shape data to generate the three-dimensional texture image; and
        displaying a display screen for allowing the user to select an application measurement mode capable of manually adjusting a variety of parameters related to capturing of the image of the object in the light receiving section, or a simple measurement mode capable of manually adjusting a smaller number of parameters than in the application measurement mode in terms of adjusting a variety of parameters related to capturing of the image of the object in the light receiving section.

* * * * *